United States Patent [19]
Liepa

[11] Patent Number: 6,037,948
[45] Date of Patent: Mar. 14, 2000

[54] METHOD, SYSTEM, AND COMPUTER PROGRAM PRODUCT FOR UPDATING TEXTURE WITH OVERSCAN

[75] Inventor: Peter E. Liepa, Don Mills, Canada

[73] Assignee: Silicon Graphics, Inc., Mountain View, Calif.

[21] Appl. No.: 08/813,325

[22] Filed: Mar. 7, 1997

[51] Int. Cl.[7] .................................................. G06T 11/00
[52] U.S. Cl. .............................................................. 345/430
[58] Field of Search ............................................. 345/430

[56] References Cited

U.S. PATENT DOCUMENTS 5,230,039  7/1993  Grossman et al. ....................... 345/430

OTHER PUBLICATIONS

Foley, et al., "Second Edition in C: Computer Graphics Principles and Practice," pp. xvi–xxii, 649–729, 741–744, Addison–Wesley Publishing Company, 1996.

Hanrahan, P. and Haerberli, P., "Direct WYSIWIG Painting and Texturing on 3D Shapes," *Comuter Graphics,* 24(4) pp. 215–223, ACM Press, Aug. 1990.

StudioPaint 3d User Guide, pp. iii–xii, 121–149, 231 and 248–249, Alias/Wavefront, Copyright 1994–1995.

StudioPaint Version 3.1 User Guide Supplement, pp. i–iii, 25–26, Alias/Wavefront, Copyright 1994–1996; first made publicly available after Mar. 7, 1996.

Watt, A. and Watt, M., "Advanced Animation and Rendering Techniques: Theory and Practice," pp. 139–201, ACM Press, 1992.

*Primary Examiner*—Almis R. Jankus
*Attorney, Agent, or Firm*—Sterne, Kessler, Goldstein & Fox P.L.L.C.

[57] ABSTRACT

A system, method, and computer program product are provided for updating texture on a graphical display object with overscan. A preprocessor stage defines an overscan region representing an extension of an object surface rasterized in texture space. A texture update stage creates a dilated texture map that includes updated mapped texels for a mapped region and updated overscan texels corresponding to the overscan region, such that texture is updated in the mapped region and the overscan region. Texel-based and polygon-based preprocessor stages and texture update stages are provided.

27 Claims, 16 Drawing Sheets

24 X 24 TEXELS ▨ RASTERIZED TEXELS ☐ IDEAL POLYGONS

METHOD, SYSTEM, AND COMPUTER PROGRAM PRODUCT FOR UPDATING TEXTURE WITH OVERSCAN

BACKGROUND OF THE INVENTION

1. Field of the Invention

The present invention relates to textured computer graphics applications and systems.

2. Related Art

Texture mapping is a well-known and commonly used technique for creating surface detail. During rendering, an image stored as a texture map is mapped to an object surface to provide surface detail. Each object surface is composed of or tesselated into geometric primitives, such as, polygons (e.g. triangles). The quality of the texture mapping depends upon the parameterization of an object. Discontinuities and boundaries in the parametrization can result in undesirable artifacts (including seaming) in the rendering of a texture mapped surface.

Texture painting applications and systems are now available which allow a user to add texture detail to a computer graphics object or scene by painting. See, e.g., Pat Hanrahan and Paul E. Haeberli, "Direct WYSIWYG Painting and Texturing on 3D Shapes," Computer Graphics (SIGGRAPH '90 Proceedings), pp. 215–223, (incorporated in its entirety herein by reference). Various types of texture painting systems include screen space painting, tangent space painting, parameter space painting, and texture space painting.

During texture painting, a user's paint strokes or brush stamps define a texture paint area on an object surface where a user wants texture detail to be added to an object surface. A texture map is created (or updated) to include the texture paint area defined by the user during texture painting. A textured object that includes the texture paint area is then rendered by performing a texture mapping operation using texture from the created texture map.

The quality of the rendered textured object depends upon the quality of the created texture map and upon the parameterization of an object surface in texture space. Aliasing artifacts are due to different discretizations involved in texture mapping, such as, the representation of a texture image by discrete texels stored in a texture memory. The image of a surface in texture space is only approximated by a set of mapped texels. Individual mapped boundary texels (that is the mapped texels at the end of a conventional raster scanline) generally lie partially inside and partially outside of an ideal object surface boundary. Also, individual unmapped boundary texels (that is unmapped texels at or near the end of a conventional raster scanline) generally lie partially inside and partially outside of an ideal object surface boundary.

As recognized by the inventor, artifacts are ultimately due to the influence of these so-called unmapped boundary texels. The value of unmapped boundary texels will influence a surface rendering. Moreover, conventional filtering methods which are often used to reduce artifacts can actually contribute to artifacts given the influence of unmapped boundary texels.

FIGS. 1A to 3B illustrate the artifacts problem encountered in a conventional screen space painting application. In screen space painting, a brush (which can be thought of a two-dimensional disk) is located in a plane between the user and the object model. Paint is projected down to the object geometry. FIG. 1A shows a square representing an object model in object space. As shown in FIG. 1B, a simple tessellation for the square in FIG. 1A consists of two triangles, which are parameterized non-contiguously in texture space. At this point, texture can be represented by a solid color, e.g. red.

In FIG. 2A, paint has been applied in a geometry view. That is, a paint stroke has been painted in screen space on a plane over the displayed square. The paint stroke shown in this example, however, has not been projected onto the parameterized triangles in texture space (FIG. 2B).

FIG. 3A shows the projection of the paint (that is the wavy line paint stroke) into texture space, and in particular, onto the two parameterized triangles in the texture map. A texture map region is updated to include the paint stroke as projected onto the two triangles (FIG. 3A).

Conventional texture mapping techniques are then used to map texture from the newly created texture map to a display object. FIG. 3B shows the resultant display of a square with texture applied for the paint stroke. During rendering, the texture map of FIG. 3A is used. In this example, the created texture map is very low resolution, 64×64 texels, to produce a highly aliased look. Texture, however, is missing at the boundaries of the geometry (i.e. along the edges of the paint stroke at triangle edges). Texture is also missing along the diagonal of the two triangles—a problem referred to herein as "seaming." Similar discontinuities and artifacts arise in other types of texture painting applications, e.g., tangent space painting, parameter space painting and texture space painting.

A method, system, and computer program product are needed which create and update texture maps to minimize or eliminate seaming artifacts. The influence of unmapped boundary texels in a texture map needs to be reduced. In particular, when creating or updating a texture map, mapped boundary texels need to be continuously extended. A texture updating application and system which creates and updates texture maps to minimize or eliminate seaming artifacts during texture painting and warping is especially needed.

SUMMARY OF THE INVENTION

The present invention provides a method, system, and computer program product for creating and updating a texture map that minimizes or eliminates seaming artifacts. According to the present invention, in addition to mapped boundary texels, unmapped boundary texels and other overscan texels are updated to represent a texture update region. Undesirable influence from unmapped boundary texels in a final rendered image is reduced. Seaming problems are reduced or eliminated. Parameterizations can have more than a minimal discontinuity, that is, parameterized objects can be separated by greater distances without seaming.

According to one embodiment of the present invention, a system, method, and computer program product are provided for updating texture for a texture update region with overscan. A preprocessor stage defines an overscan region representing an extension of an object surface rasterized in texture space. A texture update stage creates a dilated texture map. The dilated texture map includes updated mapped texels for a mapped region and updated overscan texels corresponding to an overscan region. Texel-based and polygon-based preprocessor stages and texture update stages are provided.

Texture is updated in the mapped region and the overscan region to represent a specified texture update region. The texture update region can be specified in painting and/or non-painting workflows. For example, in texture painting applications, a texture update region can be specified by a texture paint stroke. In texture warping applications, a texture update region can be specified by a source-to-target texture translation identification.

According to a texel-based embodiment of the present invention, an overscan region defining means creates an overscan array. Elements in the overscan array corresponding to boundary texels of the mapped region have direction codes, each direction code identifies at least one neighboring overscan texel in the texture map. To create a dilated texture map, for each mapped boundary texel that is to be updated to represent a specified texture update region, a corresponding element in the overscan array is checked to determine whether a direction code is present. When a direction code is present in an overscan element, the direction code is interpreted to identify at least one overscan texel. Each identified overscan texel is updated corresponding to the specified texture update region, e.g. the painted surface area or warped texture region. Subsequent generations of overscan are carried out by recursively checking elements in the overscan array corresponding to each identified overscan texel to determine whether a direction code is present and interpreting the direction code to identify and update further levels of overscan texels.

According to one example of a texel-based embodiment of the present invention, a k-generation overscan array is created and stored. First, the number of overscan levels (k) and texture map dimensions (m,n) are determined. A (m×n) coverage array is created. Coverage array elements are initialized to zero. A (m×n) overscan array is then created. Overscan array elements are initialized to zero. A graphical object surface to be displayed is rasterized using texture coordinates into the coverage array. Mapped elements in the coverage array are then set to one.

For k generations in the coverage array, all zero-valued elements adjoining i-valued elements are set to i+1. For each of the i+1 valued coverage array elements, one adjoining i-valued element is chosen. A direction code is added in the overscan array at a position corresponding to the position of the chosen adjoining i-valued element in the coverage array. The direction code has a value identifying at least one corresponding i+1 valued adjoining neighbor position in the overscan array.

According to a polygon-based embodiment of the present invention, an overscan region defining means creates an overscan polygon set. The overscan polygon set covers at least an overscan margin extending from a mapped polygon set corresponding to the rasterized object surface. A dilated texture map is created by updating the mapped region of a texture map to represent texture corresponding to a specified texture update region (e.g., a paint stroke or warping region). Polygons in the mapped region are identified and updated to correspond to texture for the specified texture update region.

In addition, for each updated polygon at an object surface boundary, a check is made for the presence of a corresponding overscan polygon in the overscan polygon set. For each overscan polygon that is found, a corresponding unmapped region of the texture map is updated, as appropriate, to represent the specified texture update region.

According to an example of a polygon-based embodiment of the present invention, an overscan region defining means constructs an overscan polygon set by determining a mapped polygon set representing the object surface in texture space; preprocessing the mapped polygon set to identify boundary edges and vertices; and computing a set of preliminary overscan polygons based on an overscan margin. Intersections between overlapping polygons in the set of preliminary overscan polygons are resolved to produce the overscan polygon set In one example, a set of overscan preliminary polygons is computed by constructing a quadrilateral having first, second, third and fourth sides for each boundary edge having a first and second vertex. The first side is the respective boundary edge. The third side is constructed approximately parallel to the first side and offset by a predetermined distance from the first side. The second and fourth sides each connect the first and third sides. The second side extends from a first vertex at the boundary edge. The fourth side extends from a second vertex at the boundary edge.

When the first vertex is a concave boundary vertex, the second side extends and is approximately perpendicular to the boundary edge. When the first vertex is a convex boundary vertex, the second side extends at an angle substantially equal to 135 degrees–A/4, where A is an interior angle of the convex boundary vertex. When the second vertex is a concave boundary vertex, the fourth side extends approximately perpendicular from the boundary edge. When the second vertex is a convex boundary vertex, the fourth side extends at an angle approximately equal to 135 degrees–A/4, where A is an interior angle of the convex boundary vertex. For each convex boundary vertex, an isosceles triangle is constructed having two equal edges adjacent to edges of quadrilaterals constructed for boundary edges at the convex boundary vertex.

In one example, intersections between polygons are resolved by transforming z-coordinates of vertices in the set of preliminary overscan polygons that are not in the mapped polygon set from a zero value to a negative predetermined value (–w). A hidden surface algorithm is then executed to identify visible parts of the set of preliminary overscan polygons. The visible parts of the preliminary set of overscan polygons are then transformed back to an x, y plane to produce the overscan polygon set.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIGS. 1A to 3B illustrate artifacts encountered in a conventional texture painting application.

FIG. 1A shows a square representing an object surface consisting of two triangles in screen space.

FIG. 3B shows the resultant display of the square with texture corresponding to the applied paint stroke after rendering using the texture map of FIG. 3A.

FIG. 6A illustrates an example 24×24 texture map having mapped regions of rasterized texels that correspond to a square parameterized as two non-contiguous triangles.

FIG. 6B shows the determination of first generation overscan texels in a first level overscan with respect to the mapped regions of FIG. 6A.

FIG. 6C shows directional arrows pointing from rasterized boundary texels to first generation overscan texels.

FIG. 6D shows an example of hexadecimal direction codes used to uniquely identify directional arrows.

FIG. 6E further shows overscan array codes associated with the rasterized boundary texels in a first generation overscan.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Table of Contents

Figure 1A:
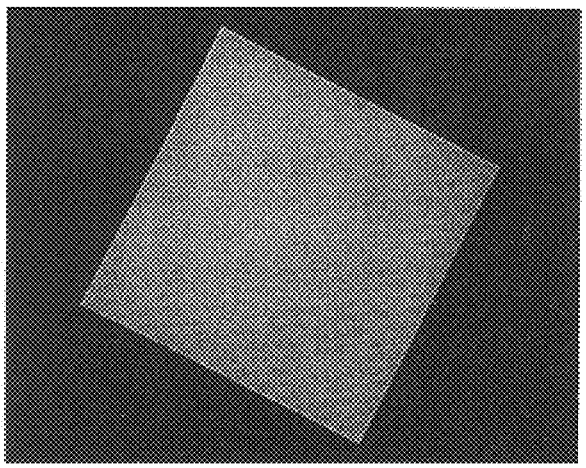
Figure 1B:
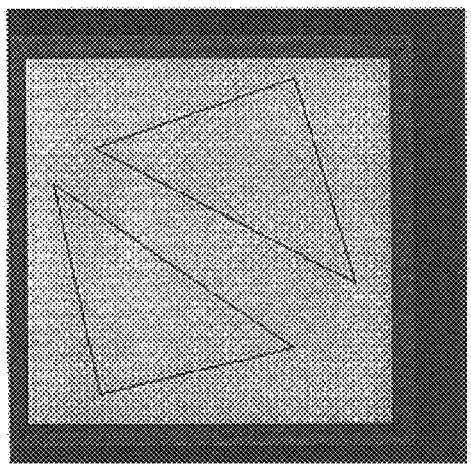
FIG. 1B shows a parameterization for the square in FIG. 1A consisting of the two triangles mapped non-contiguously in texture space.

1. Overview and Terminology
2. Example Environment
3. Texture Updating with Overscan
   a. Texel-Based Overscan
      (1) Texel-Based Preprocessing Stage
      (2) Texel-based Texture Update Stage
   b. Polygon-Based Texture Painting
      (1) Polygon-Based Preprocessing Stage
      (2) Polygon-Based Texture Update Stage
4. Example
5. Conclusion

DETAILED DESCRIPTION OF THE EMBODIMENTS

1. Overview and Terminology

The present invention provides a texture updating tool which reduces or eliminates discontinuities and artifacts. A system, method, and computer program product are provided for updating texture with overscan. A preprocessor stage defines an overscan region representing an extension of an object surface rasterized in texture space. A texture update stage creates a dilated texture map. The dilated texture map includes updated mapped texels for a mapped region and updated overscan texels corresponding to an overscan region. Texture is updated in the mapped region and the overscan region to represent a specified texture update region. Texel-based and polygon-based embodiments for overscan are described.

A "surface" is a set of convex polygons, certain pairs of which share edges. An "edge" in a surface is an edge of any of its polygons. A "boundary edge" is an edge that belongs to only one polygon. The "boundary" of a surface is the set of all of its boundary edges.

Computer graphics systems use polygons to define a surface for purposes of rendering and displaying the surface. "Surface" is not intended to exclude surfaces which can be converted to a polygonal surface description. For example, NURBS and implicit surfaces can be converted through tessellation to surfaces composed of triangles.

The term "mapping" refers, unless otherwise specified, to a mapping from a surface to parameter space. The mapping is also called the parameterization of a surface. A parameterization assigns, for each point on the surface, a point in parameter space, also referred to as the point's mapping coordinates or texture coordinates. For a polygonal surface, a parameterization is defined by assigning parameter space coordinates to each vertex of the surface and then interpolating for all other points. There is no restriction that a mapping be one-to-one; it may be many-to-one, and not all points in parameter space are necessarily "hit" by the mapping.

"Texture mapping" is a conventional computer graphical process by which surface attributes are determined from a texture map.

"Parameter space" is a two dimensional space, often referred to as the UV plane, consisting of all points (u,v). "Texture space" is an area in parameter space, including but not limited to, a unit square. Texture space is the space in which a texture map is considered to reside. Texture space can be continuous (also called ideal) or discrete. A texture map is an m×n array of texels, where m and n are different or identical integers. Texture space can be discretely coordinatized by integers running from 0 to m-1 and 0 to n-1.

Given a surface and a parameterization, an image of the surface in texture space can be defined which is the result of mapping all of the points of the surface into texture space. For a texture space that is defined by an m×n set of texels, the image of a surface in texture space can be regarded as a set of texels which can be calculated by scan converting the polygons of the surface into discrete texture space using conventional scan conversion techniques. Scan conversion into texture space uses the parameterization of the surface's polygons. The discrete image of a surface in texture space usually does not correspond to the set of texels which intersect the ideal surface image. This is because conventional scan conversion converts disjoint polygons into disjoint sets of pixels/texels.

The scan conversion is defined not only by the parameterization of the surface and the resolution of the texture map, but also by a "wrapping rule" which determines whether the texture is wrapped, clipped or clamped when applied in surface rendering. These rules come into play when parameterization extends beyond a unit square, that is, beyond a parameter space unit square [0,1]×[0,1] consisting of all points (u,v), such that both u and v are greater than or equal to zero and less than or equal to one. A surface point whose parameterization is (1.5,1.5), for example, will have a texture space image of (0.5,0.5) if the texture map wraps, and will have no image whatsoever if the texture map is clipped or clamped.

Given a surface, a parameterization and wrapping rule, and a texture map resolution, mapped texels for a surface rasterized into texture space can be determined. For example, if a set T includes all texels and a set S includes only texels which are hit when scan converting the surface into its image in discrete texture space, then a texel in set S is called a mapped texel, a texel in T but not in S is called an unmapped texel.

Considering an ideal image of a surface boundary in texture space, any texel which intersects with this ideal boundary is called a boundary texel. "Mapped boundary texels" refer to the mapped texels which intersect with the ideal surface boundary in texture space. "Unmapped boundary texels" refer to those boundary texels which intersect with the ideal surface boundary in texture space, but which are not included as mapped texels in the rasterization of the object surface in texture space.

The term "texture painting" is used herein to refer to any computer application and/or system that allows a user to paint texture onto a graphical display object. Texture painting, can include, but is not limited to, screen space painting, tangent space painting, parameter space painting, and texture space painting.

"Specified texture update region," "texture update region," and equivalents thereof, refer to any texture update region specified in texture painting and/or non-painting workflows. A texture update region can include, but is not limited to, a region defined by a texture paint stroke in any form of texture painting, a new texture image overlay, a texture warping, and texture cut-and-paste techniques.

2. Example Environment

The present invention is described in terms of an example computer-based textured graphics environment. Given the description herein, it would be obvious to one skilled in the art to implement the present invention in any general computer including, but not limited to, a computer graphics processor (single chip or multiple chips), high-end to low-end graphics workstations, gaming platform, virtual machine (e.g. Java-created application), and network architectures (e.g., client/server, local, intermediate or wide area networks). In one preferred example, the present invention can be implemented in software, firmware, hardware, or any combination thereof, in a texture painting tool, such as, the StudioPaint 3D product released by Alias/Wavefront of Silicon Graphics, Inc., and executed on a graphics workstation manufactured by Silicon Graphics, Inc. (e.g., an Indigo$^2$, Indy, Onyx, $O_2$ or Octane workstation). A further example computer system is described below with respect to FIGS. 13A and 13B, but is not intended to limit the present invention.

Description in these terms is provided for convenience only. It is not intended that the invention be limited to application in this example environment. In fact, after reading the following description, it will become apparent to a person skilled in the relevant art how to implement the invention in alternative environments.

3. Texture Updating with Overscan

Figure 4:
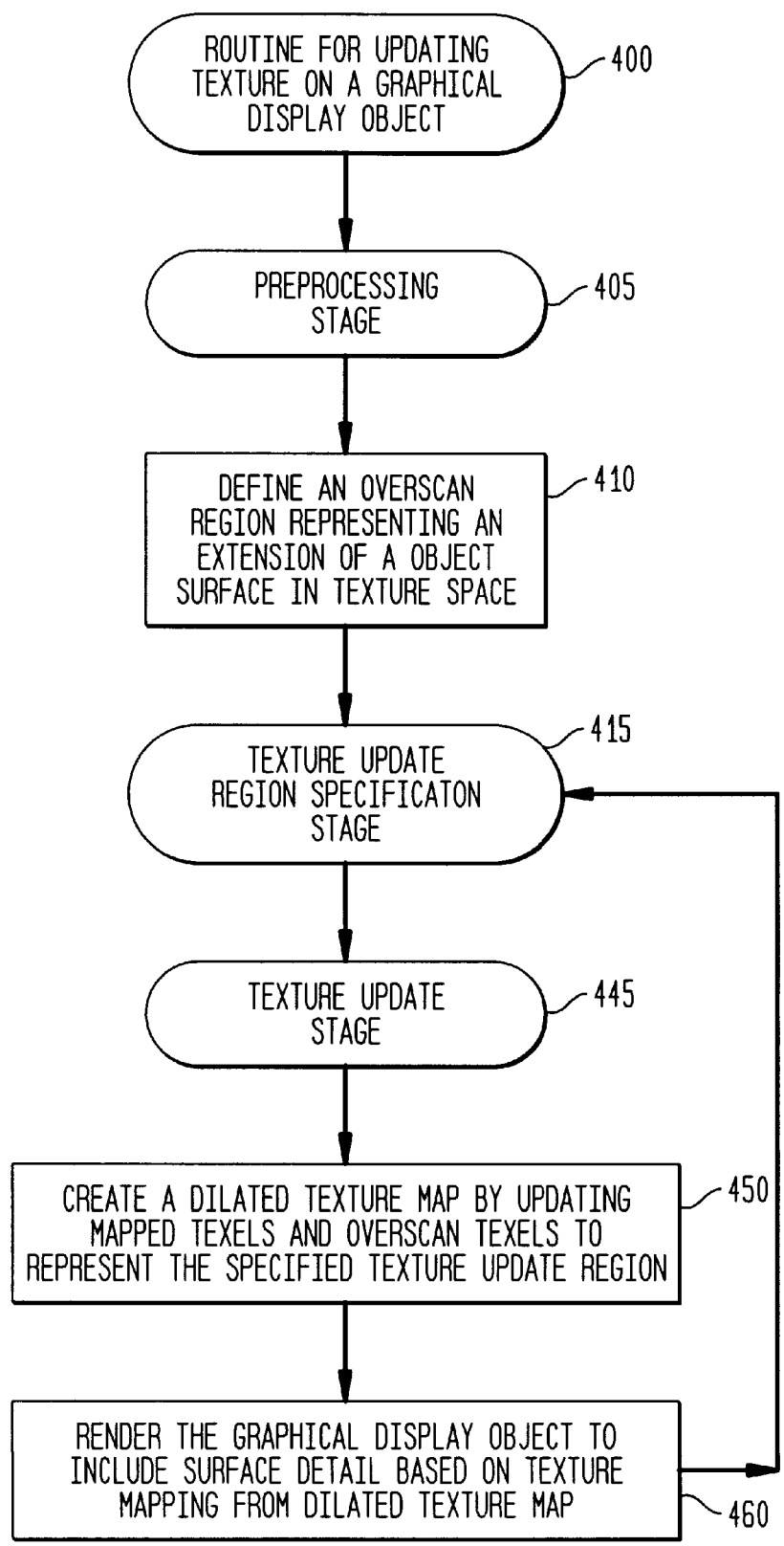
FIG. 4 is a flowchart that shows a routine for painting texture according to the present invention.

FIG. 4 is a flowchart of a routine 400 for painting texture on a graphical display object, according to one embodiment of the present invention. Routine 400 includes three stages: preprocessing stage 405, texture update region specification stage 415, and texture update stage 445.

In the preprocessing stage 405, an overscan region is defined (step 410). The overscan region represents an extension of an object surface in texture space. In conventional texture painting, an object surface is rasterized to a corresponding mapped region in texture space. According to the present invention, an overscan region is defined that can be used to further represent a texture paint stroke in texture space. As described in further detail below, the overscan region can be defined based on texels or based on polygons.

Texture update region specification stage 415 can be any application or system for specifying a texture update region. The texture update region can be specified in painting and/or non-painting workflows. For example, in texture painting applications, a texture update region can be specified by a texture paint stroke. In texture warping applications, a texture update region can be specified by a source-to-target texture translation identification.

In one embodiment, texture update region specification stage 415 represents a texture painting stage. Any type of texture painting can be used with overscan according to the present invention. Such texture painting can include, but is not limited to, screen space painting, tangent space painting, parameter space painting, and texture space painting. See, e.g., Pat Hanrahan and Paul E. Haeberli, "Direct WYSIWYG Painting and Texturing on 3D Shapes," Computer Graphics (SIGGRAPH '90 Proceedings), pp. 215–223, (incorporated in its entirety herein by reference). A painting stage can be any type of texture painting application and/or system, including but not limited to, StudioPaint 3D produced by Alias/Wavefront, a Silicon Graphics company. A user paints on a selected texture channel or channels to mark a painted surface area. A user can select from any number of different texture channels supported by a graphics system. A user can select from different types of textures, including but not limited to, texture for influencing specularity, reflectivity, reflection, color, incandescence, transparency, bump mapping, displacement, shading map, particle emitting systems (e.g., velocity, lifetime, and surface emitting texture factors), friction, hardness, and softness. These different texture channels can be listed as options in a pull down menu for convenient selection. A texture map corresponding to the selected texture channel is initialized as needed.

Any computer graphics painting tool can be used in texture painting, such as pencils, brushes, and air brushes. Any peripheral input device, including but not limited to, a mouse, trackball, joy stick, keyboard, and touch screen, can be used to control texture painting. Paint appears on a temporary two-dimensional screen layer above an object surface. Two-dimensional tools such as transform, warp, sharpen, and blur painting tools can be used to further alter paint for a selected area.

Once the desired painted area is marked, paint is projected to a texture map for texture mapping to the object surface. Paint projection can be carried out automatically such as when a user switches between graphical display windows or at entry of a specific command by the user to project paint. As described in further detail below with respect to texture update stage 445, a texture region update module updates a texture region of a texture map to represent an area corresponding to the paint. According to the present invention, this texture region update module further defines an overscan region to update texture for an unmapped region.

An object can be a two-dimensional or three-dimensional object model composed of a number of object surfaces. Object models can be created by a texture painting application directly or imported from other graphics applications. Large models can be accommodated, such as, non-polygonal, continuous surfaces (e.g., NURBS) or polygonal models. Object models can be panned, zoomed, rotated, and transformed according to conventional graphics manipulating techniques.

Paint can be applied on all or parts of an object model, and can be restricted to stop at the edge of an object surface. Paint can seep through to the other side of the model or be restricted to only visible surfaces. Once paint is projected, flat, unwrapped textures can be extracted as separate layers and placed in a texture window. By manipulating the texture window, a user can zoom in and add detail, work on texture layers, etc.

As a user paints and projects paint, a texture map can be created automatically for each texture channel on each object surface. By rasterizing the object surface to texture space, a mapped region is formed. Depending upon the user selected paint channel(s) and area, texel values are set to represent texture for the painted texture channel.

As mentioned above, any type and number of texture channels can be used. A specular texture channel creates shiny highlights on an object model. Specularity can be thought of as the tightness of highlights on a surface (soft as opposed to harsh). Glossy plastic surfaces tend to have whitish highlights, while metallic surfaces tend to have a specular highlights that are of a color similar to the diffused color.

Painting on a reflectivity texture channel influences the intensity of reflections on a surface. The intensity of the reflection is controlled by the value of the color with which a user paints. In one example, reflectivity can be defined as a value on a scale between 0 and 1. Painting with white, which has a value of one, produces a completely reflective surface, showing almost none of the surface color. Painting with black, which has a value of zero, results in no surface reflections. Examples of approximate reflectivity values include car paint, 0.4; glass, 0.7; mirror, 1.0; chrome, 1.0.

A color texture channel can be selected to paint in straight color. An incandescent texture channel is selected to make a surface appear incandescent. In other words, the surface appears as if it were emitting light. Incandescence can be used to recreate the glow of fireflies, lava or phosphorescent moss or any other incandescent effect. By default, surfaces in an incandescent channel are set to black giving them no incandescence. Incandescent texture channel can then be set to any color a user wants depending on a desired effect. The higher a color's value (which can be set in a color editor), the greater the incandescent effect.

A transparency texture channel can be selected to influence the transparency of an object surface. In one example, transparency can be defined on a scale between 0 and 1. By default, surfaces painted with a transparency texture channel are set to black, i.e., have a value of 0.0. Colors with higher values (as determined by a color editor) will produce corresponding degrees of transparency. For example, painting with white (value 1.0) will result in a completely transparent surface. A color with a value of 0.5 will produce 50% transparency. Generally, the color for a transparency is the same color used for an object surface, although different colors can be used for creating special effects. Any hue or saturation can be used to give the transparency a color range.

A bump texture channel allows the user to add bumps and dents to an object surface by texture painting. Painting on the bump texture channel creates a bump map texture map that makes a surface appear bumpy or rough. The object surface, however, is not changed. In contrast, the displacement channel allows a user to dent or raise an object surface. Texture painting in a displacement texture channel actually creates a physical change to an object surface during rendering. In other words, the object surface is displaced along the normals according to the intensities of the pixels in the displacement texture map.

In texture update stage 445, a dilated texture map is created according to the present invention (step 450). The dilated texture map is created by updating mapped texels and overscan texels to represent texture corresponding to the specified texture update region. By creating a dilated texture map according to the present invention, artifacts (including boundary discontinuities and seaming problems) are reduced or eliminated.

Texture update stage 445 can be implemented as a texture update procedure in software, firmware, hardware, or any combination thereof. As mentioned above, texture update stage 445 can use an overscan region (texel-based or polygon-based) with any type of texture painting or non-painting workflow. Texture painting can include, but is not limited to, screen space painting, tangent space painting, parameter space painting, and texture space painting. See, e.g., Pat Hanrahan and Paul E. Haeberli, "Direct WYSI-WYG Painting and Texturing on 3D Shapes," Computer Graphics (SIGGRAPH '90 Proceedings), pp. 215–223, (incorporated in its entirety herein by reference).

In screen-space painting, a screen-space brush is projected onto the surface using an inverse viewing transformation. Tangent space painting is similar to screen-space painting. A tangent space brush is projected onto a surface by first placing the brush in a tangent plane tangent to the surface at the brush position. The brush is then projected onto the surface in the direction parallel to the normal. This a reasonable approximation of a 3-D brush painting a solid object since the tangent-space brush orientation conforms to the surface orientation.

In parameter-space painting, a 2-D parameter-space brush paints directly into two-dimensional texture maps at the texture coordinates of the brush position on the surface. Brush samples and texture samples are mapped one-to-one. Texture-space painting is similar to parameter-space painting. A 2-D texture-space brush paints brush strokes directly into regions of two-dimensional texture maps.

Like a conventional texture region update stage without overscan, texture region update stage 445 can encompass a wide variety of graphics processing features, IBNLT source space (IBNLT screen, tangent, parameter, texture), frequency (IBNLT per stamp, per stroke, on demand), filtering (IBNLT point sampled, mip-mapped, Elliptical Weighted Averaging, analytic), visible surface determination (IBNLT respecting or ignoring visibility), silhouette policy (IBNLT fading paint towards a silhouette, cutting off paint at a silhouette, jumping to an adjacent surface), distortion characteristics (IBNLT parametric brush compensation), region of effect (IBNLT texel or polygon), and scanning order (IBNLT texel or polygon), where the abbreviation IBNLT is used herein to refer to the phrase "including but not limited to."

For example, in screen space painting, texture update stage 445 uses a mapping F from screen space to texture space to project paint. Mapping F can then be used to project paint from screen space to the object surface in texture space. Unprojected paint remains in screen space. Texture update stage 445 updates a texture map to represent the projected paint, so that the surface can be re-rendered to include the paint as projected onto the surface. An inverse mapping $F^{-1}$ can be used to transform an ideal texture space to ideal screen space. In order to update a texel, the texel is considered to be a square region R in ideal texture space. The region $F^{-1}(R)$ is examined in screen space. This screen space region may correspond to any number of screen space pixels and subpixels of unprotected paint. Filtering is used to arrive at a texel color value Color($F^{-1}(R)$). Any known filtering technique can be used depending upon the desired filter speed versus accuracy. The color value in general contains an alpha component (i.e. transparency factor) which is then blended into the existing texel value.

Alternatively, as used in StudioPaint 3D, texels can be visited by scan converting surface polygons into texture space, as opposed to going through the texels in row and column order in the texture map. This allows coherency to be exploited to make the determinations of $F^{-1}(R)$ and Color($F^{-1}(R)$) more efficiently.

When a texel is visited that has an overscan code, the texture update stage 445 updates texture for the adjoining overscan texels (and so on recursively) as done conventionally for mapped texels. Thus, according to the present invention, texture is extended into the overscan region. The extension of texture is made by applying conventional texture region update techniques (as described above) to overscan texels. In particular, overscan texels are calculated with reference to screen paint in essentially the same manner as for mapped texels. Thus, overscan texels are generally not (but can be) a "bleed" or a "clone" of mapped texels. In some cases, modifications are desirable. For example, if surface polygons are being scan converted, coherence allows $F^{-1}(R)$ to be calculated incrementally within a polygon because the polygon is planar and all texels within the polygon are related to screen space by similar affine mappings. This coherence can be exploited for overscan texels, which are treated as extensions of their related polygons. However, in this case visible surface determinations have to be suppressed, because the extrapolated screen space Z-values can lead to undesired occlusions.

Finally, in step 460, a graphical display object is rendered to include surface detail based on texture mapping from the dilated texture map. Any conventional texture mapping technique can be used. See, e.g., A. Watt et al., *Advanced Animation and Rendering Techniques* (Addison-Wesley: New York, N.Y. 1992), pp. 139–152 and 178–201, and Foley et al., *Computer Graphics: Principles and Practice,* 2nd. Ed. in C (Addison-Wesley: New York, N.Y. 1996), pp. 741–744 (both of which are incorporated herein by reference).

Steps 415–460 can be repeated many times by a user. Steps 405–410 will be executed, as necessary, typically when the parameterization of a surface or wrapping rule has changed, or the resolution of a texture map changes.

a. Texel-Based Overscan

Figure 5A:
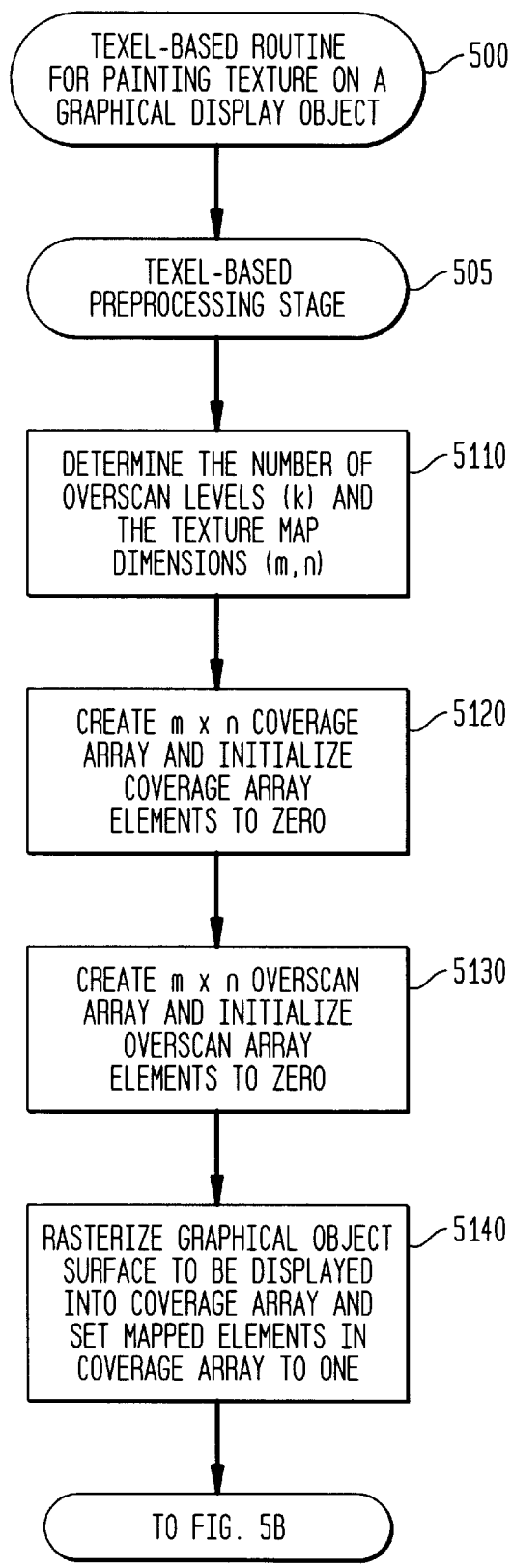
FIGS. 5A, 5B, and 5C are flowcharts that show a texel-based routine for painting texture according to the present invention.
Figure 5B:
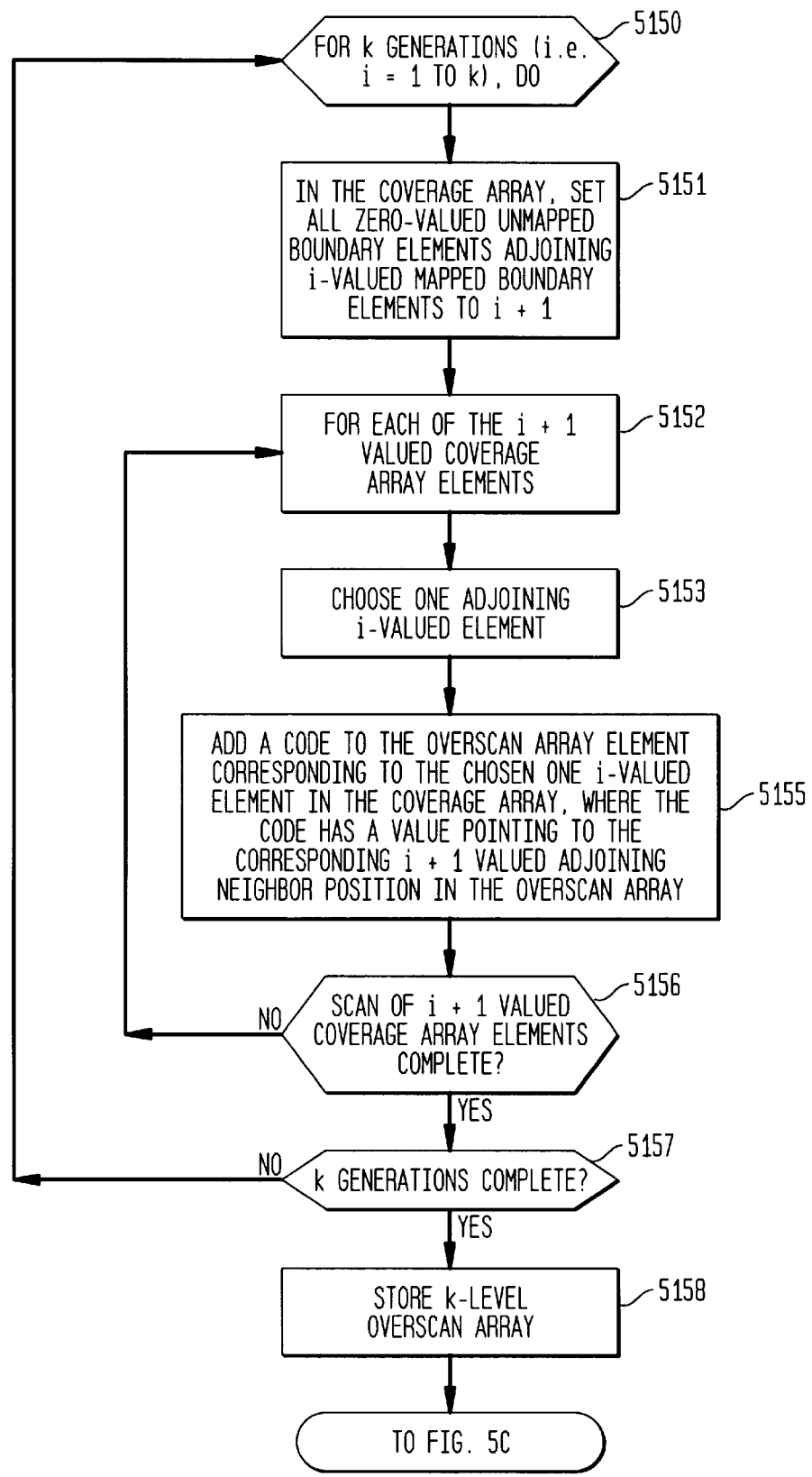
Figure 5C:
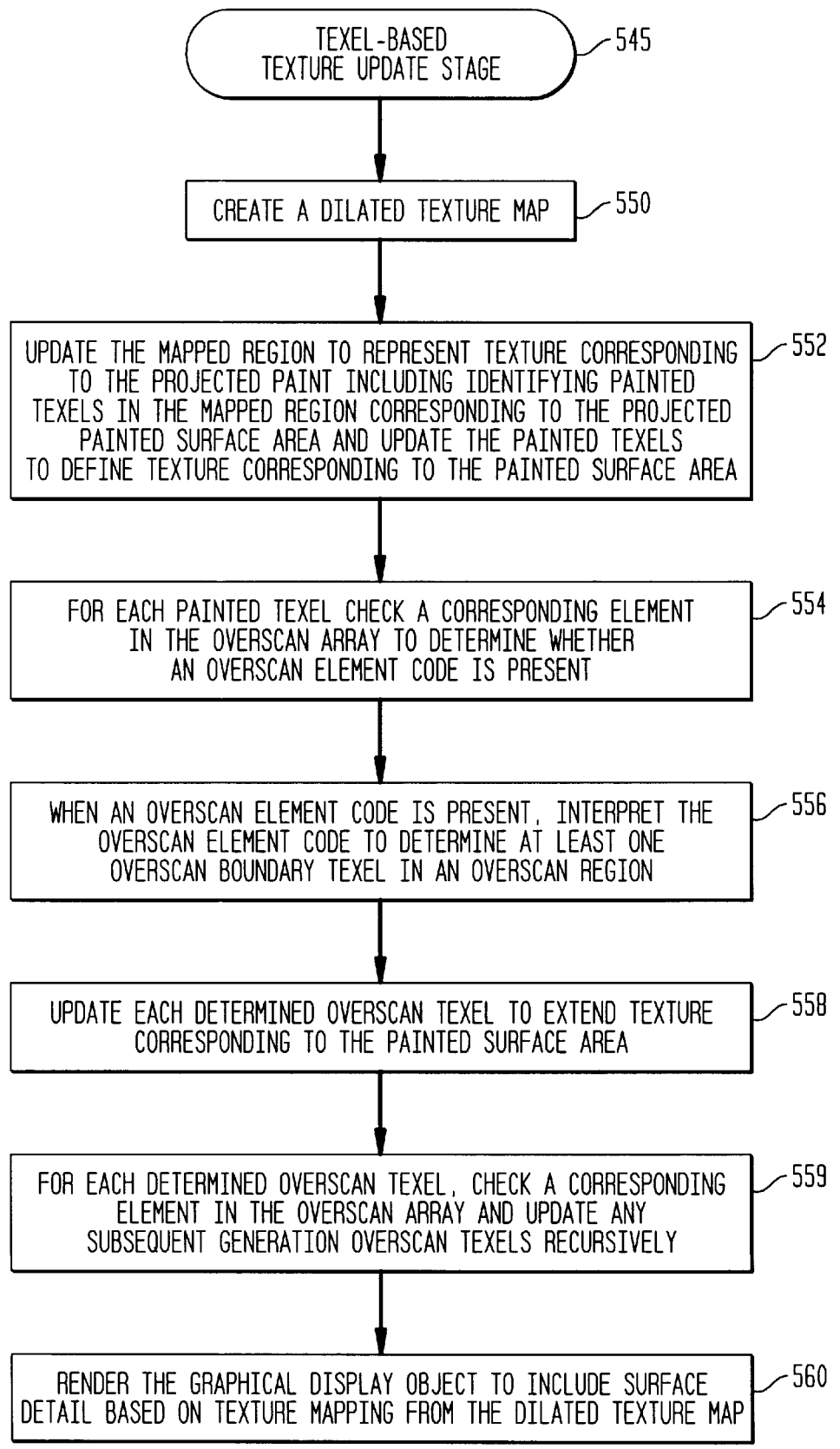

FIGS. 5A to 5C are flowcharts showing a texel-based routine 500 for painting texture on a graphical display object according to one embodiment of the present invention. Texel-based routine 500 includes a texel-based preprocessing stage 505, texture update region specification stage 415, and texel-based texture update stage 545. For clarity of illustration, only the preprocessing stage 505 and texture update stage 545 are shown in detail. Texture update region specification stage 415 was described in detail above and need not be repeated. In addition, in the interest of brevity, texel-based routine 500 and polygon-based routine 800 are described primarily with reference to texture painting. However, as would be obvious to a person having ordinary skill in the art given this description, the present invention is not so limited. Routines 500 and 800 can be used in non-painting workflows, such as warping.

(1) Texel-Based Preprocessing Stage

In texel-based preprocessing stage 505, the number of overscan levels (k) and the texture map dimensions (m,n) are determined (step 5110). Any number of overscan levels can be selected or set. Likewise, the texture map dimensions m, n can vary in size depending on a particular graphics system and application. Square and rectangular texture maps can be used. Texture map dimensions m,n can represent any number of texels, including but not limited to, 1×1 texel, 2×2 texels, 4×4 texels, 8×8 texels, 16×16 texels, 64×64 texels,. . . 1,024×1,024 texels, . . . 4,096×4,096 texels, . . . n×n texels where n is power of 2.

In step 5120, an m×n coverage array is created. Coverage array elements in the m×n coverage array are initialized to zero. In step 5130, an m×n overscan array is created. Overscan array elements in the created m×n overscan array are initialized to zero.

In step 5140, the object surface to be displayed or texture painted is rasterized to texture space according to conventional standard rasterization techniques. Elements in the coverage array (referred to as mapped elements) correspond to mapped texels of the rasterized graphical object surface in texture space. In one example, these coverage array elements corresponding to mapped texels are set to one.

Figure 6A:
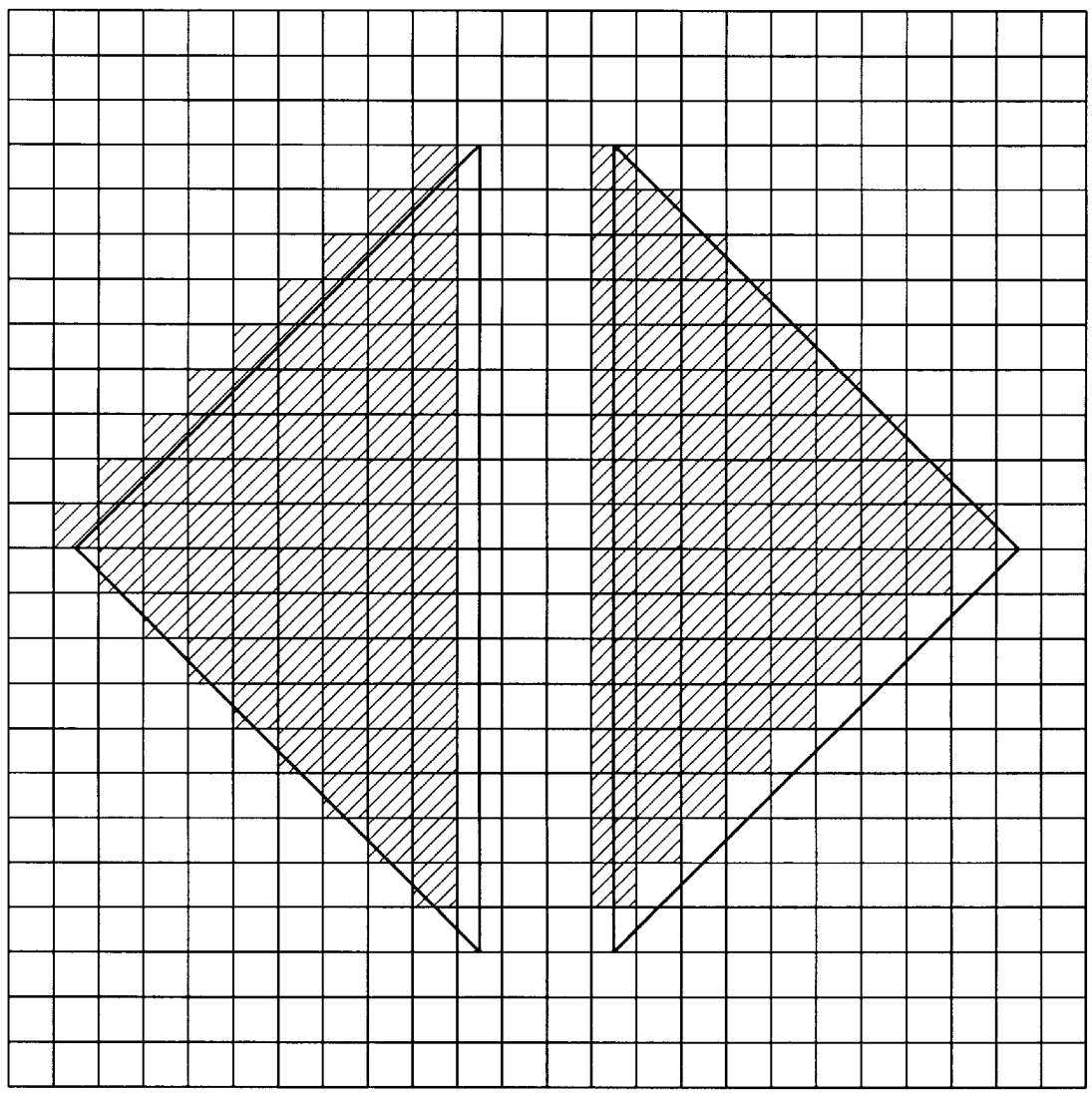
FIGS. 6A to 6E illustrate an example of a first generation overscan according to the routine of FIGS. 5A to 5C.
Figure 6B:
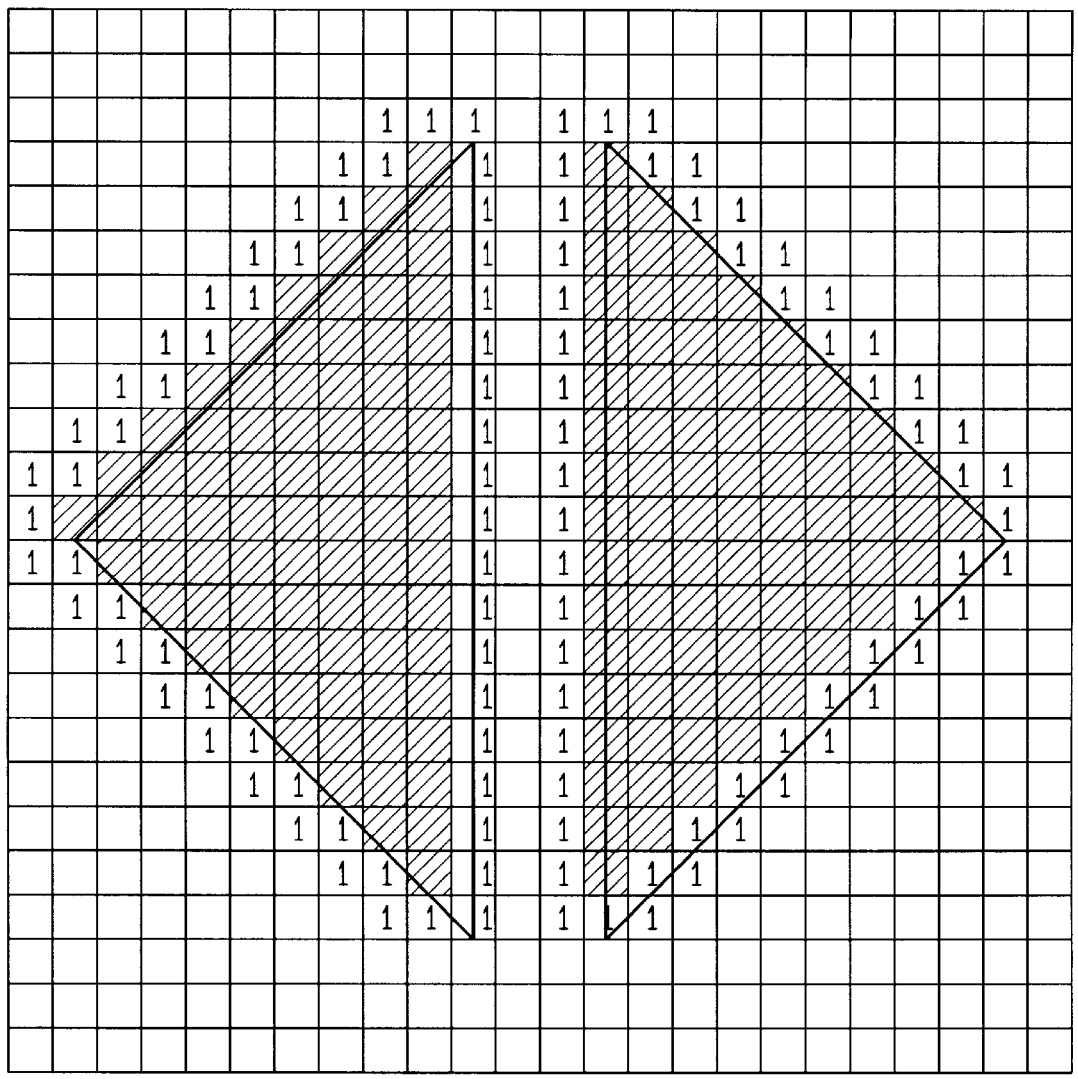

As shown in FIG 5B, a loop 5150 is performed for each overscan level, that is, for k generations (loop 5150 repeats for i=1 to k). First, in the coverage array, all zero-valued elements adjoining i-valued elements are set to a value of i+1 (step 5151). For example, FIG. 6A shows a 24×24 texel coverage array. Rasterized mapped texels corresponding to the object surface are shown in gray. For comparison, outlines of ideal polygons rasterized in texture space are shown by a solid line. As mentioned previously in the above background section, because of the discretizations involved in a texture map, the rasterized mapped texels do not exactly correspond to the area of the ideal polygons. FIG. 6B further shows the setting of all zero valued elements adjoining 1-valued elements for a level 1 overscan, as described above with respect to step 5151. (The 2-valued elements are labelled with "1" to designate them as first generation overscan elements.)

Figure 6C:
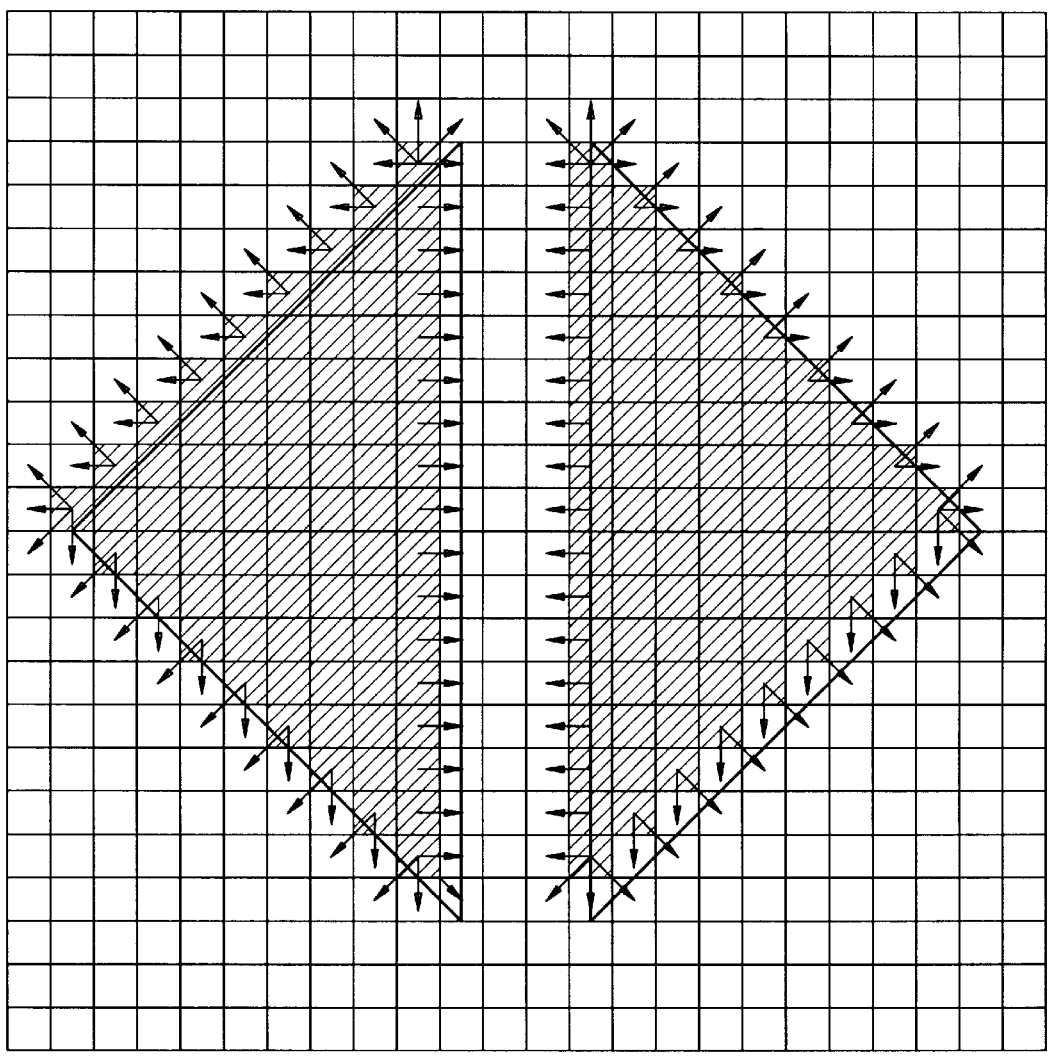

In step 5152, for each of the i+1 valued coverage array elements, a loop of steps 5153 to 5156 is performed. In particular, for each i+1 valued coverage array element, one adjoining i-valued element is selected (step 5153). FIG. 6C illustrates an example of the 2-valued coverage array elements (denoted with a 1) that adjoin chosen 1-valued elements (denoted with a gray square). Arrows are shown for purposes of illustration to better identify which texels are determined to adjoin chosen 1-valued elements.

Figure 6D:
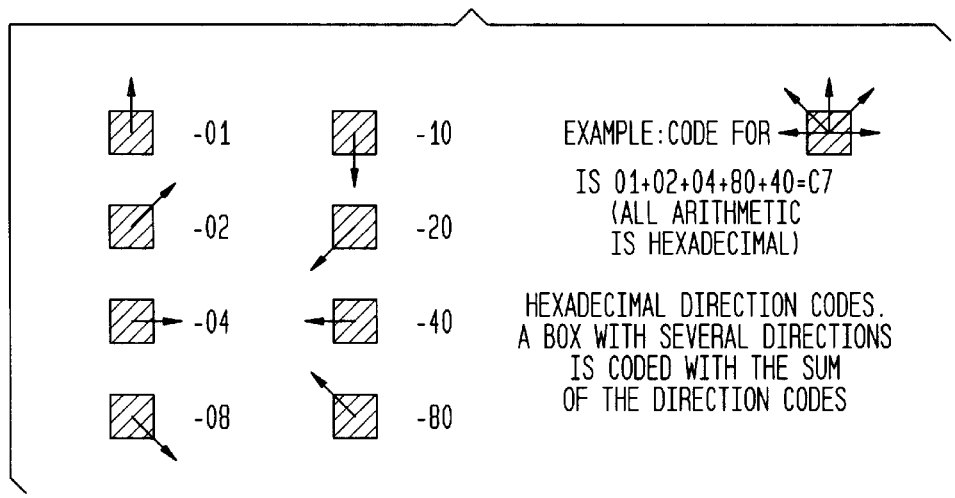

In step 5155, a code is added in the overscan array at a position corresponding to the chosen one adjoining i-valued element in the coverage array. This code has a value that identifies the corresponding i+1 valued adjoining neighbor position in the overscan array. For example, as shown in FIG. 6D, hexadecimal direction codes can be used to represent eight different directions. Each direction is coded by a different hexadecimal number. A code representing several directions can be obtained by summing the individual direction codes. Preferably, a coding scheme is used such that each individual direction code can be determined from a sum code value.

In one embodiment, for instance, the top most boundary texel of the left triangle in FIG. 6C points to five adjoining texels. The codes for each of these five directions (01, 02, 04, 80, 40) are summed to obtain a hexadecimal code C7 that can be interpreted to identify each of the adjoining texels. This hexadecimal code (C7) can then be stored in the overscan array at a position corresponding to the top most boundary texel of the left triangle.

Figure 6E:
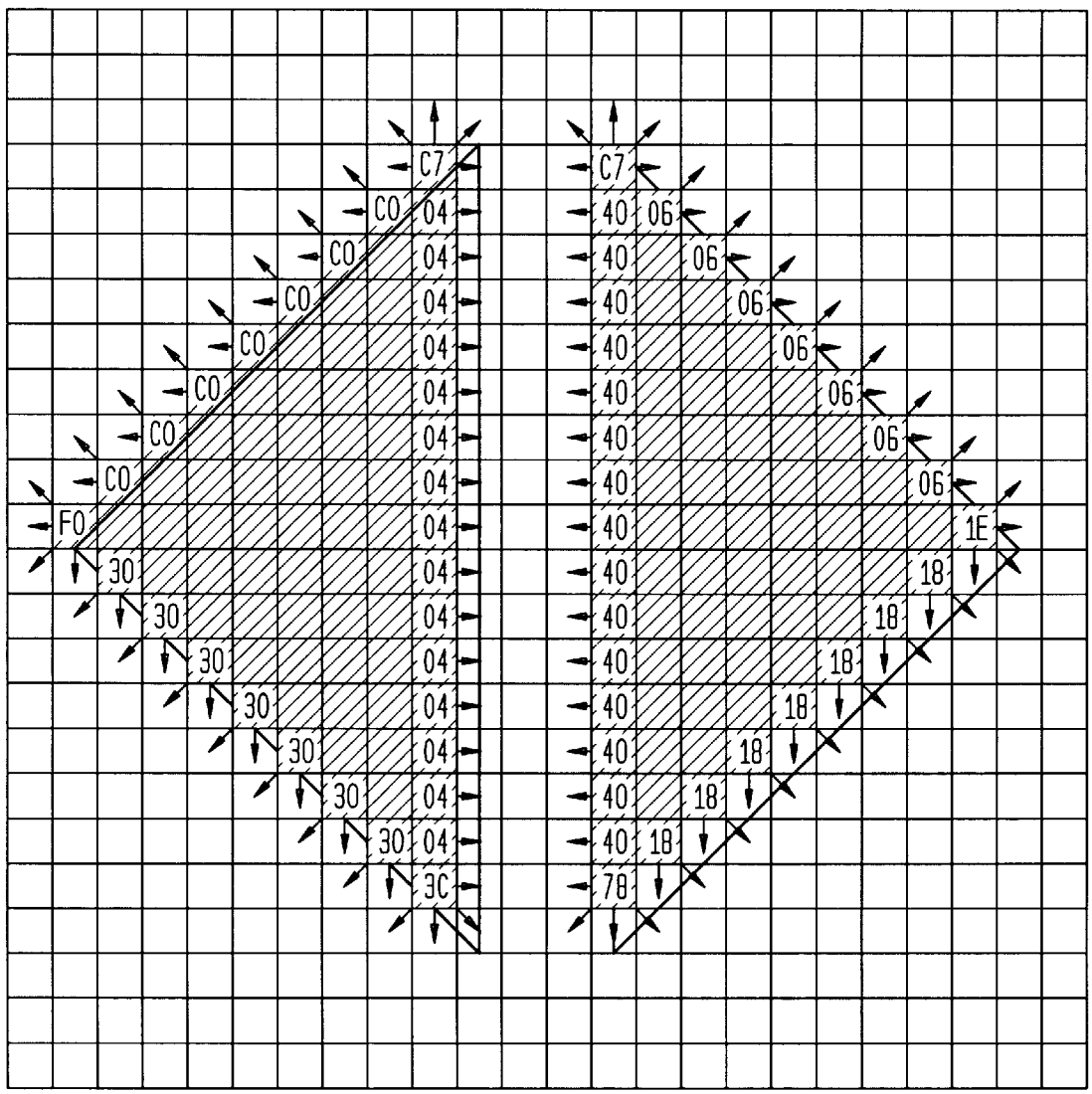

Loop 5152 continues until all i+1 valued coverage array elements have been scanned (step 5156). Loop 5150 continues recursively until k generations of overscan have been completed (step 5157). When the k-level overscan array has been built, it is preferably stored in a memory or other storage device (step 5158). FIG. 6E shows the hexadecimal direction codes used for elements in a final first generation overscan array (also called a level 1 overscan array).

As would be apparent to a person skilled in the art, given this description, the creation of an overscan array is described herein as a pre-processing stage, however, the present invention is not necessarily limited to pre-processing. For example, the overscan array can be created in real-time at any point during texture painting depending upon system processor speed, user needs, and other design considerations.

(2) Texel-based Texture Update Stage

As shown in FIG. 5C, a texel-based texture update stage 545 creates a dilated texture map (step 550). The mapped region is updated to represent texture corresponding to a paint stroke including identifying painted texels in the mapped region (step 552).

Further, according to the present invention, for each painted texel at an object surface boundary, a check is made of a corresponding element in the overscan array to determine whether an overscan element direction code is present (step 554). Alternatively, this check can be made for every mapped texel, not just boundary texels updated during painting.

When an overscan element direction code is present, the overscan element code is interpreted to determine at least one overscan texel (that is, at least one neighboring unmapped texel) in an overscan region (step 556). Each overscan texel identified by the overscan element code is then updated to represent texture corresponding to a paint stroke, i.e., a painted surface area (step 558).

Furthermore, for each overscan texel that is updated, a check is made of a corresponding element in the overscan array. If an overscan element code is present, any further overscan texels (so called subsequent generation overscan texels) are updated recursively until all overscan texels identified by the overscan array have been updated (step 559).

Finally, the graphical display object is rendered to include surface detail based on texture mapping from the dilated texture map (step 560). Any conventional texture mapping technique can be used including, but not limited to, MIP-mapping, point sampling, supersampling, filtering, interpolating, and/or blending texture mapping techniques. The coverage and overscan arrays are recalculated, as described above, if the parameterization, wrapping rule, or texture resolution change.

Figure 2A:
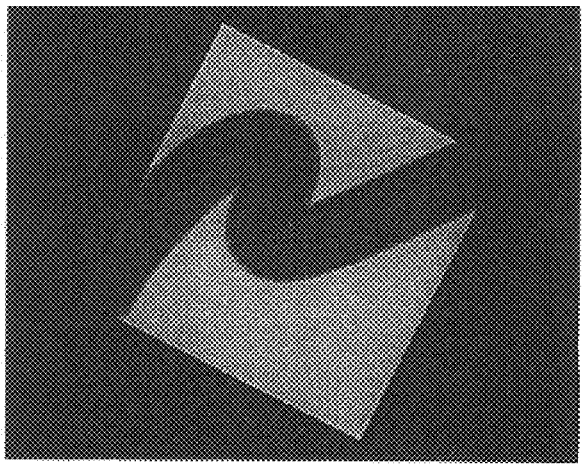
FIG. 2A shows a paint stroke applied to the geometry view of FIG. 1A.
Figure 2B:
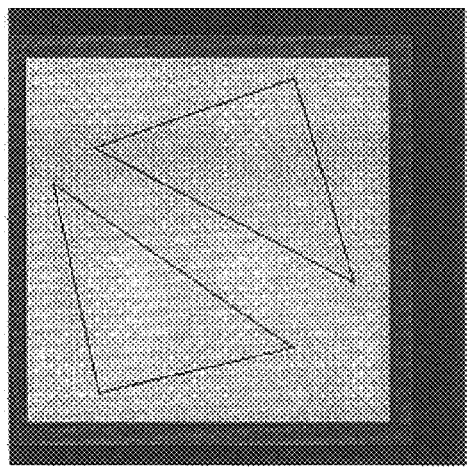
FIG. 2B (which is identical to FIG. 1B) shows a texture map prior to paint projection.
Figure 3A:
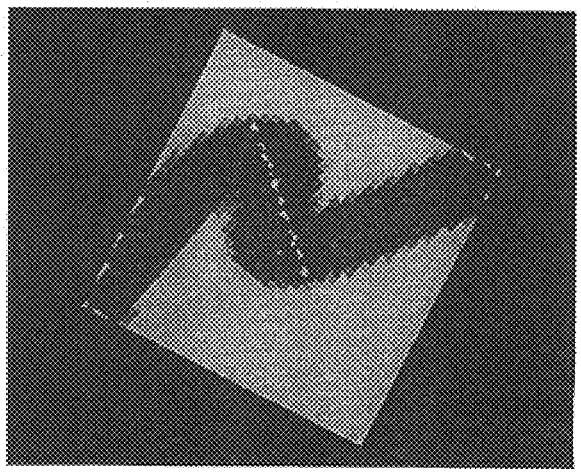
FIG. 3A shows the projection of paint onto the two mapped triangles in the texture map of FIG. 2B.
Figure 3B:
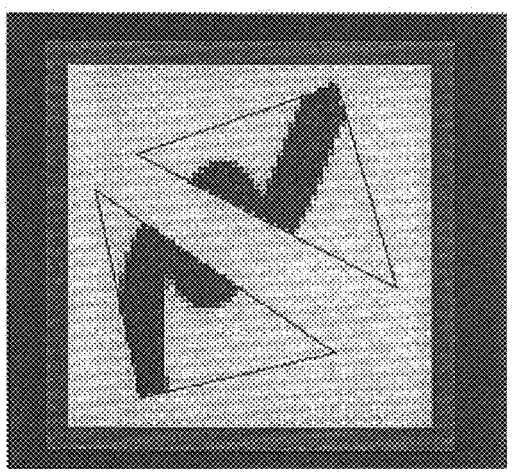
Figure 7B:
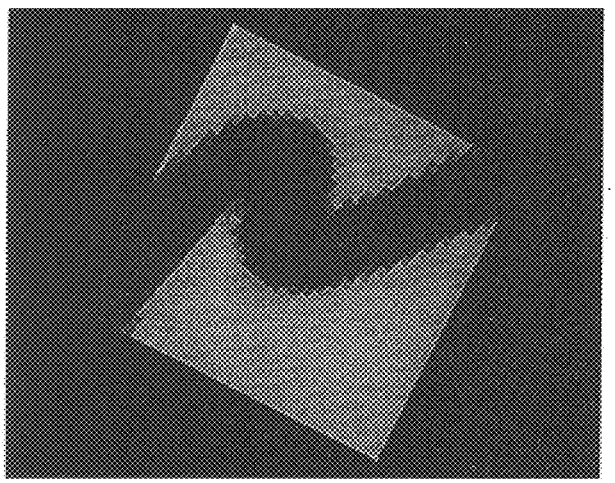
FIG. 7B shows the resultant display of the square with texture corresponding to the applied paint stroke after rendering using the dilated texture map of FIG. 7A.
Figure 7A:
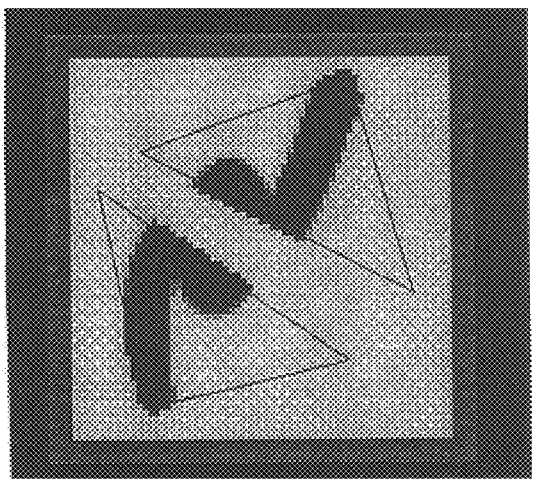
FIG. 7A shows an example of the projection of a paint stroke onto the two parameterized triangles in a dilated texture map created with a single level of overscan according to the present invention.

FIGS. 7A to 7D illustrate examples of texture painting according to the present invention using a dilated texture map. FIG. 7A shows a dilated texture map having paint projected for the paint stroke described previously with respect to FIG. 2A. Unlike the texture map of FIG. 2B, however, a dilated texture map created in the present invention is updated for the paint stroke such that the updated texels smoothly extend at boundaries beyond the object surface boundaries, as shown in FIG. 7A. In this way, when the object is rendered using the dilated texture map, artifacts such as seaming and boundary discontinuities are eliminated (see FIG. 7B).

Figure 7D:
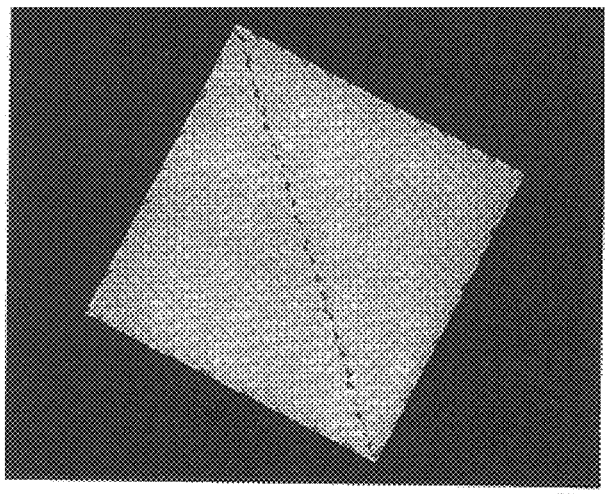
FIG. 7D shows the resultant display of the square with texture corresponding to the applied paint after rendering using the dilated texture map of FIG. 7C.
Figure 7C:
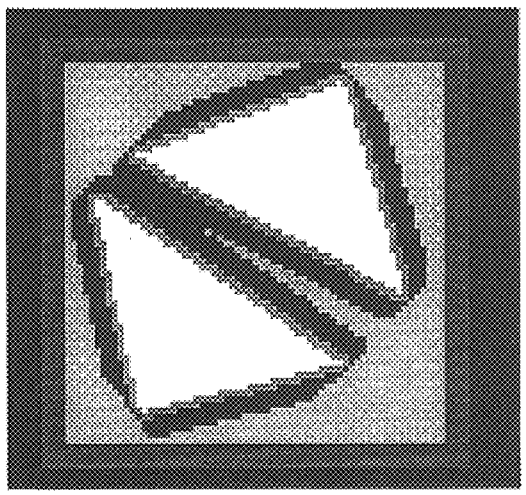
FIG. 7C shows an example of the projection of paint onto the two parameterized triangles in a dilated texture map created with different levels of overscan according to the present invention.

FIG. 7A and 7B are shown with respect to a single level of overscan. FIGS. 7C and 7D are similar to FIGS. 7A and 7B, however, multiple levels of overscan are used. In FIG. 7C, a dilated texture map has been created by painting and projecting with three different levels of overscan. In all cases the entire square was painted. Black paint was projected with a four level overscan array, Gray paint was projected with a one level overscan array. White paint was projected with a zero level overscan array. The black paint is truncated at the corners because of clipping during projection. FIG. 7D shows the resultant display of the square object surface using a dilated texture map as shown in FIG. 7C.

b. Polygon-Based Texture Painting

According to a polygon-based embodiment of the present invention, an overscan region is defined by creating an overscan polygon set. The overscan polygon set covers at least an overscan margin extending from a mapped polygon set in texture space. A dilated texture map is then created and updated for a painted surface area based on the mapped polygon set and the overscan polygon set to represent a paint stroke.

Figure 8A:
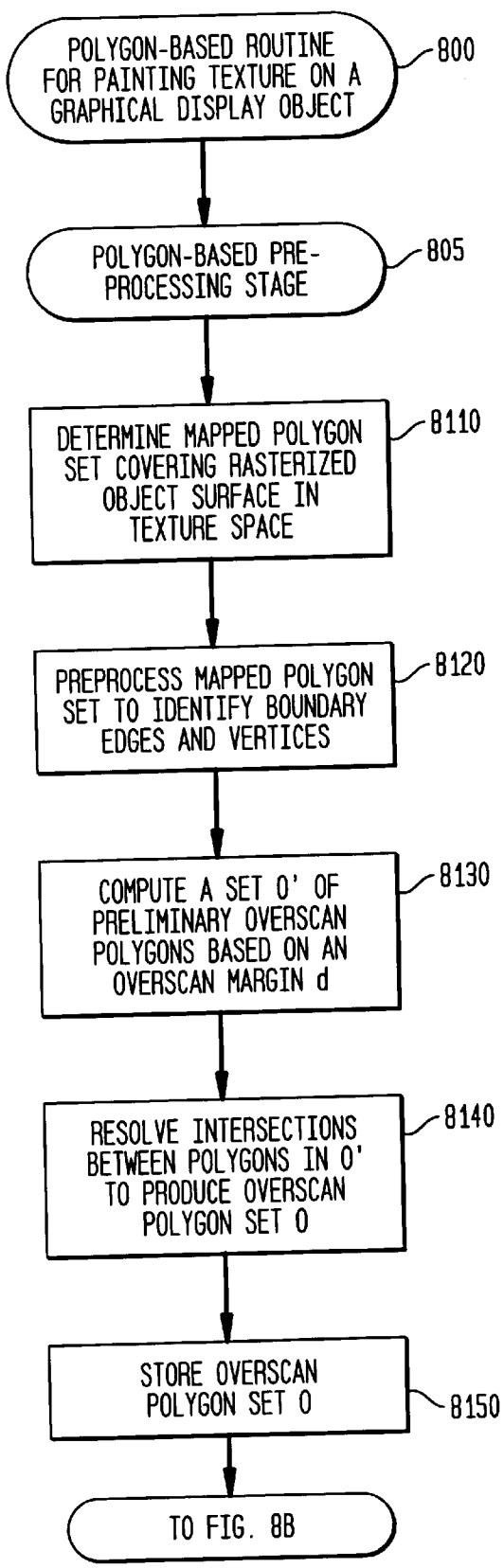
FIGS. 8A and 8B are flowcharts that show a polygon-based routine for painting texture according to the present invention.
Figure 8B:
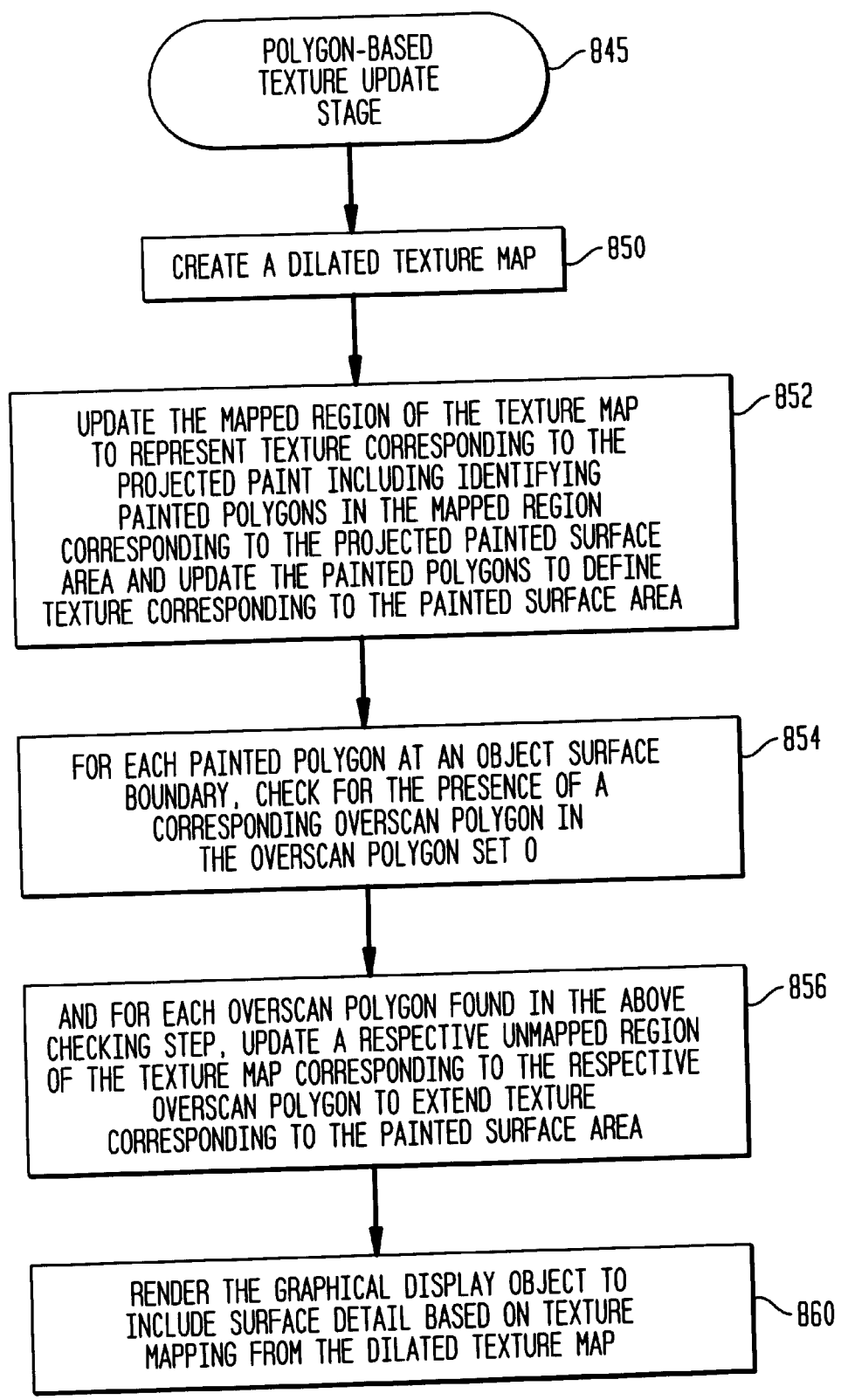

FIGS. 8A and 8B are flowcharts illustrating a polygon-based routine 800 for painting texture on a graphical display object according to another embodiment of the present invention. FIG. 8A covers steps carried out in a preprocessing stage. FIG. 8B covers steps carried out in a texture update stage.

(1) Polygon-Based Preprocessing Stage

As shown in FIG. 8A, a polygon-based preprocessing stage 805 generates an overscan polygon set according to the present invention (steps 8110 to 8150). In step 8110, a mapped polygon set is determined in texture space. In step 8120, the mapped polygon set is preprocessed to identify boundary edges and vertices (concave and convex).

A set O' of preliminary overscan polygons is computed based on an overscan margin d (step 8130). A preliminary overscan polygon is constructed for each boundary edge and vertex of the mapped polygon set. Intersections between preliminary overscan polygons in set O' are resolved to produce overscan polygon set O (step 8140). Finally, the overscan polygon set O is stored in a memory or other storage device (step 8150).

Figure 9:
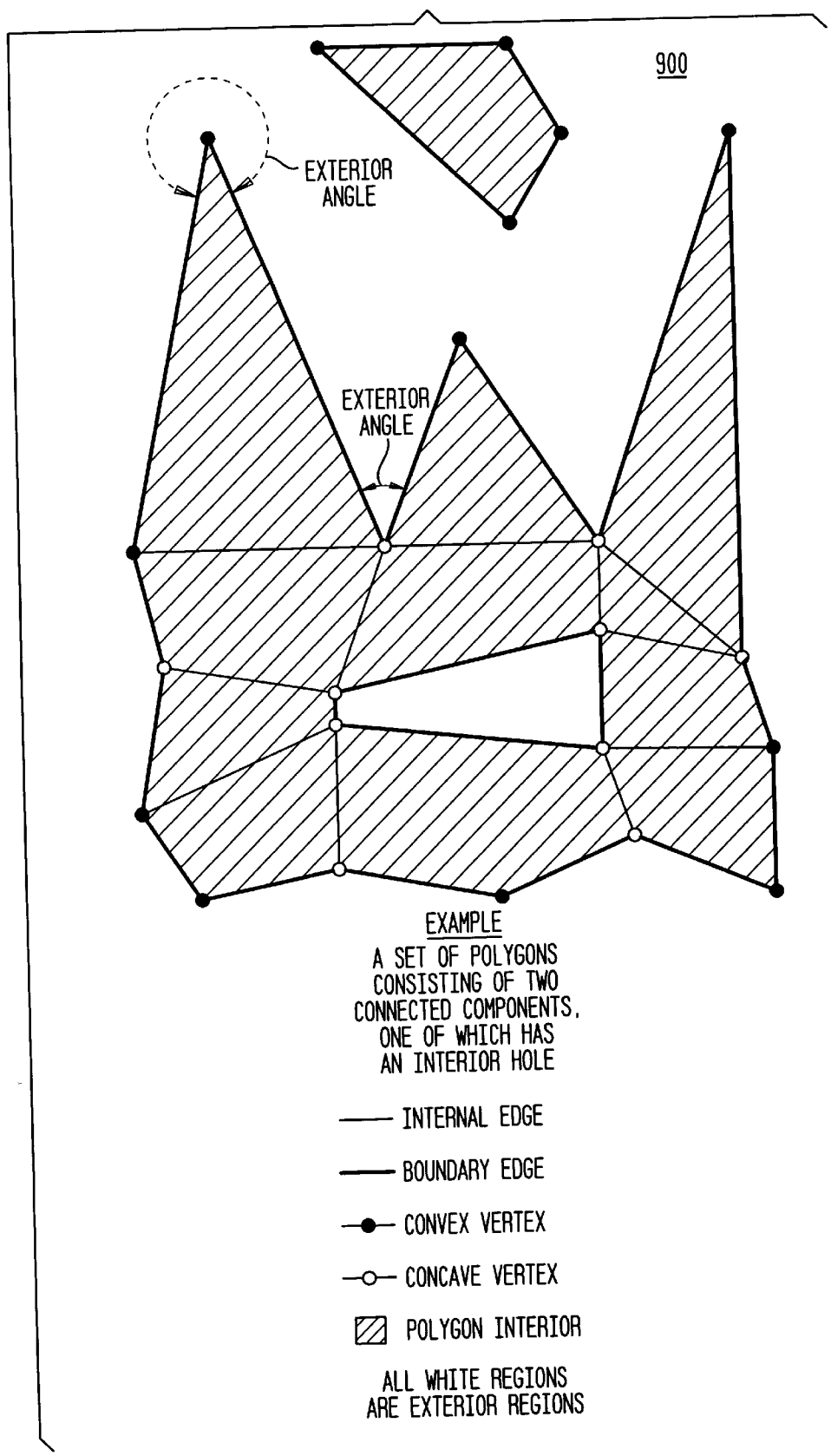
FIG. 9 is a diagram showing an example set of polygons corresponding to a mapped region in texture space.

The polygon-based preprocessing stage 805 and steps 8110 to 8150 are described in even further detail with respect to a specific example. FIG. 9 shows an example mapped polygon set 900. The mapped polygon set 900 is determined as the set of all texture-space images of the polygons of the object surface (step 8110).

According to the present invention, mapped polygon set 900 is preprocessed to identify boundary edges and vertices (concave and convex) (step 8120). For example, boundary edges are identified as the subset of polygon edges in set 900 that have only one adjacent polygon. Vertices which are at an endpoint of a boundary edge are called boundary vertices. These boundary vertices are referred to as concave or convex vertices, depending upon whether an exterior angle associated with the boundary vertices is less than or greater than 180 degrees, respectively. Interior points are inside mapped polygon set 900, exterior points are outside mapped polygon set 900. In FIG. 9, boundary edges are shown with a heavier line compared to internal polygon edges. Convex boundary vertices are denoted by a solid black dot. Concave boundary vertices are denoted by a white dot. Polygon interiors are shown in a gray half-tone.

Figure 10:
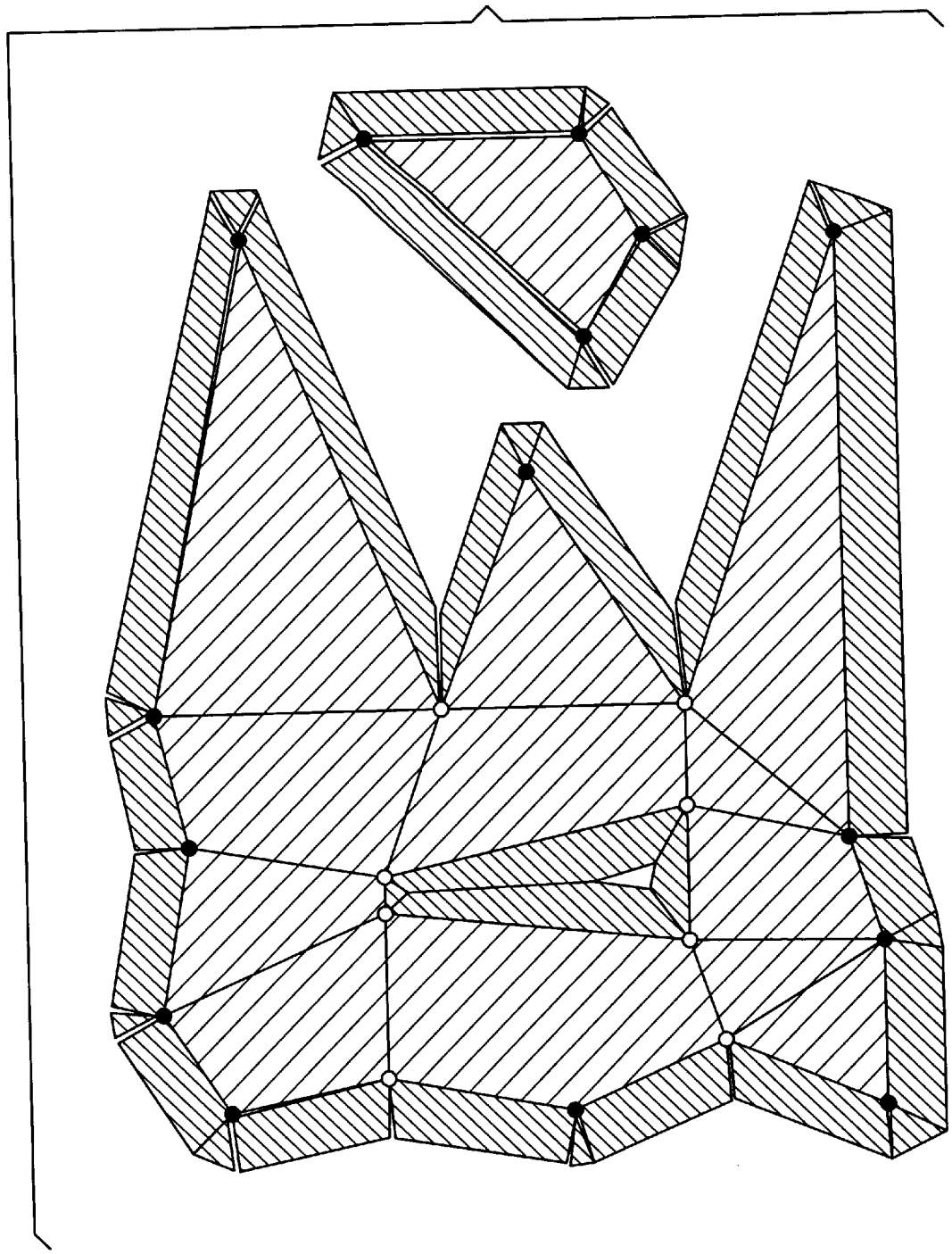
FIG. 10 is a diagram that shows the example set of polygons of FIG. 9 and an overscan set of polygons covering an overscan region according to the present invention.

According to the present invention, a set of overscan polygons 1000 is constructed based on the mapped polygon set 900 (FIG. 10). In FIG. 10, overscan polygons in an overscan polygon set 1000 (drawn generally in freehand) are depicted with a darker grey than mapped polygons in mapped polygon set 900.

According to one embodiment of the present invention, a set of overscan polygons can be generated to satisfy the following three conditions:

(1) There is one overscan polygon for each boundary edge and convex boundary vertex in a mapped polygon set 900.

(2) The distance between any interior point in set 900 and point in an exterior region E is at least an overscan margin distance w, where E is defined as the set of points not in mapped polygon set 900 or the overscan polygon set 1000.

(3) For an overscan polygon p in set O, let b be its associated boundary edge or vertex. Then all points in the overscan polygon p are closer to b than any other boundary edge or vertex of set 900.

For clarity the conditions are described above with respect to mapped polygon set 900 and overscan polygon set 1000, although overscan polygon set 1000 is drawn free-hand and is not drawn exactly according to the three conditions. Further, the above three conditions for determining an overscan polygon set are illustrative, and not intended to limit the present invention.

Figure 11:
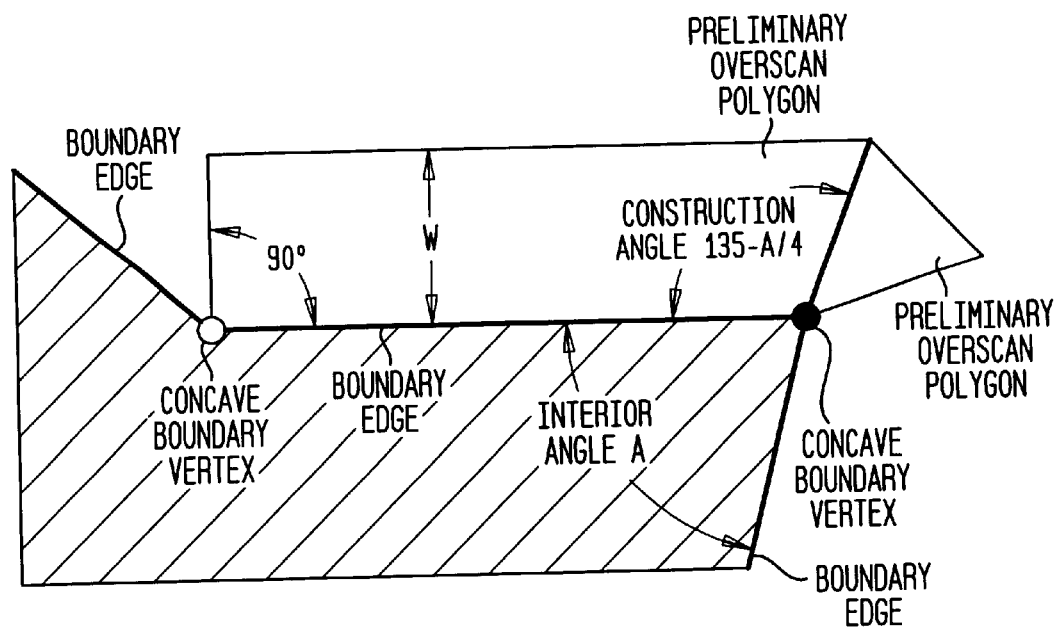
FIG. 11 is a diagram that shows preliminary overscan polygons used in determining an overscan polygon set.
Figure 12:
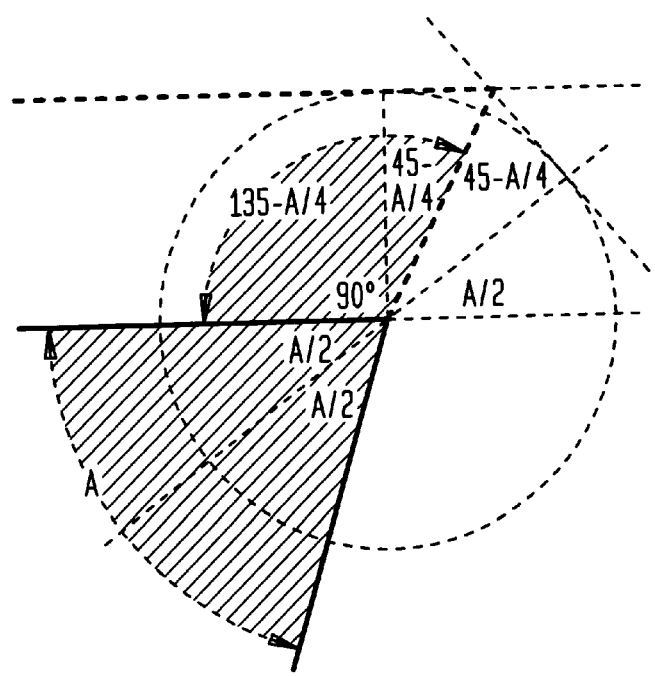
FIG. 12 is diagram that shows in more detail angle calculations used in determining the preliminary overscan polygons shown in FIG. 11.

According to another embodiment of the present invention, overscan polygon set 1000 can be constructed by computing a set O' of preliminary overscan polygons (step 8130), and then resolving intersections between overlapping polygons (step 8140). For example, as shown in FIGS. 11 and 12, a set of preliminary overscan polygons can be computed as follows. For each boundary edge having a first and second vertex, construct a quadrilateral having first, second, third and fourth sides. The first side being the respective boundary edge and the third side being substantially parallel to the first side and offset by a predetermined distance from the first side. The second and fourth sides each connecting the first and third sides, the second side extending from a first vertex at the boundary edge, and the fourth side extending from a second vertex at the boundary edge.

When the first vertex is a concave boundary vertex, the second side extends substantially perpendicular from the boundary edge, and when the first vertex is a convex boundary vertex, the second side extends at an angle substantially equal to 135 degrees–A/4, where A is an interior angle of the convex boundary vertex. Likewise, when the second vertex is a concave boundary vertex, the fourth side extends substantially perpendicular from the boundary edge, and when the second vertex is a convex boundary vertex, the fourth side extends at an angle substantially equal to 135 degrees–A/4, where A is an interior angle of the convex boundary vertex. For each convex boundary vertex, an isosceles triangle is constructed having two equal edges adjacent to edges of quadrilaterals constructed for boundary edges at said convex boundary vertex.

Some preliminary overscan polygons, however, might be overlapping, especially when the mapped polygon set has non-adjacent boundary edges located fairly close to one another, such as, when the mapped polygon set forms a spiral or surrounds an interior hole. Accordingly, intersections between overlapping overscan polygons in the preliminary overscan polygon set need to be resolved. In one example, prelimary overscan polygons are considered in the (x,y) plane of (x,y,z) space and intersections are resolved by transforming z-coordinates of vertices in the set of preliminary overscan polygons that are not in the mapped polygon set 900 from a zero value to a negative predetermined value (–w). A hidden surface algorithm for polygons is then executed to determine visible parts of the set of preliminary overscan polygons as viewed orthographically from the positive Z-axis. Hidden surface algorithms are well-known in computer graphics applications and systems. Any conventional hidden surface algorithm for polygons can be used. See, e.g., Foley et al., *Computer Graphics: Principles and Practice,* 2nd. Ed. in C (Addison-Wesley: New York, N.Y. 1996), chapter 15, "Visible-Surface Determination," pp. 649–720 (incorporated herein by reference). The resulting set of visible polygons is then projected back to an x, y plane by setting z-coordinates to zero to produce a final overscan polygon set 1000.

In an optional step, overscan polygons may be broken down or merged or both. For example, overscan polygons, which may be non-convex, may be tessellated into convex polygons. In another example, boundary vertex polygons may be split into two parts, and each part merged with the adjoining boundary edge polygon.

A description of the overscan polygon set 1000 is then stored in a memory or other storage device (step 8150). In this way, the overscan polygon set 1000 can be accessed during texture painting to be used in creating a dilated texture map, as described below with respect to a polygon-based texture update stage 845. As would be apparent to a person skilled in the art, given this description, the creation of an overscan polygon set 1000 is described herein as a preprocessing stage, however, the present invention is not necessarily limited to preprocessing. For example, the overscan polygon set can be created in real-time at any point during texture painting depending upon system processor speed, user needs, and other design considerations.

(2) Polygon-Based Texture Update Stage

FIG. 8B is a flowchart showing a polygon-based texture update stage 845. The texture update stage occurs after a user has painted on a selected texture channel and projected the paint as described earlier with respect to painting stage 415. In the texture update stage of the present invention, a dilated texture map is created (steps 850–856). In step 852, the mapped region of a texture map is updated to represent texture corresponding to a texture paint stroke. Painted polygons in the mapped region corresponding to the paint stroke are identified and updated.

Each painted polygon at an object surface boundary is checked to determine the presence of a corresponding overscan polygon in the overscan polygon set (step 854). For each overscan polygon found in the above checking step, a corresponding unmapped region of the texture map is updated (step 856). In this way, the texture map is dilated to smoothly extend texture corresponding to the paint stroke on an object surface.

Finally, the graphical display object is rendered to include surface detail based on texture mapping from the dilated texture map (step 860). Polygon-overscan polygons are recalculated, as described above, if the parameterization, wrapping rule, and/or texture map resolution change.

4. Example Computer Graphics System

Figure 13A:
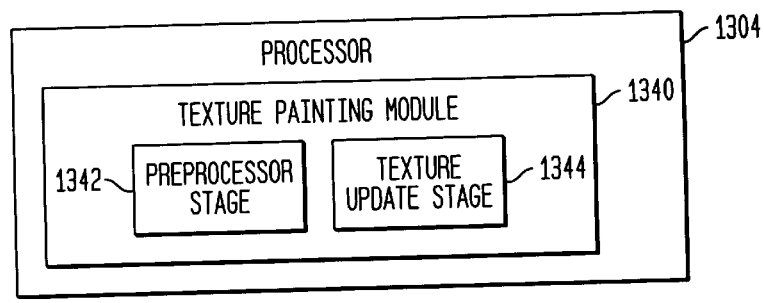
FIGS. 13A and 13B show an example computer system for implementing the present invention.

As mentioned above, the present invention can be implemented as part of any texture painting application and/or system. FIG. 13A is a block diagram showing a processor 1304 capable of running a texture painting module 1340. Texture painting module 1340 can support painting stage 415 as described above.

According to the present invention, preprocessor stage 1342 and texture update stage 1344 are included. Preprocessor stage 1342 can include the preprocessing stages 405, 505, and 805 described above. Texture update stage 1344 can include texture update stages 445, 545, and 845 described above. Preprocessor stage 1342 and texture update stage 1344 each can be implemented as software, firmware, hardware, or any combination thereof Software implementations of preprocessor stage 1342 and texture update stage 1344 can include computer program logic recorded on a computer useable medium in a computer program product, memory, or other storage device.

Figure 13B:
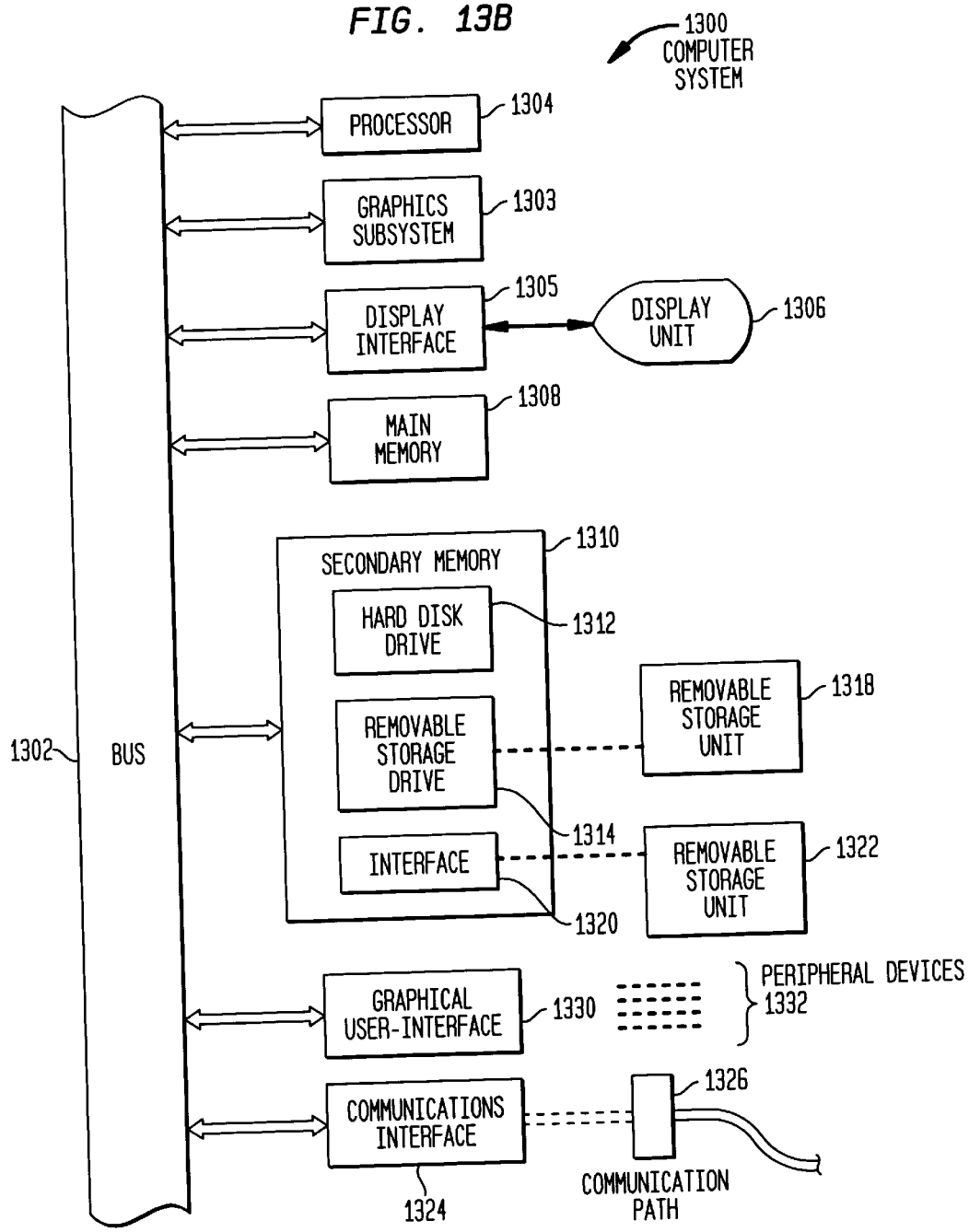

FIG. 13B shows a block diagram illustrating an example environment in which the present invention can operate. The environment is a computer system 1300 that includes one or more processors, such as processor 1304. Computer system 1300 can include any type of general computer.

The processor 1304 is connected to a communications bus 1302. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 1300 includes a graphics subsystem 1303. Graphics subsystem 1303 can be any type of graphics system supporting computer graphics. Graphics subsystem 1303 can be implemented as one or more processor chips. The graphics subsystem 1303 can be included as a separate graphics engine or processor, or as part of processor 1304. Graphics data is output from the graphics subsystem 1303 to bus 1302. Display interface 1305 forwards graphics data from the bus 1302 for display on the display unit 1306.

Computer system 1300 also includes a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc., which is read by and written to by removable storage drive 1314. As will be appreciated, the removable storage unit 1318 includes a computer usable storage medium having stored therein computer software and/or data.

In alternative embodiments, secondary memory 1310 may include other similar means for allowing computer programs or other instructions to be loaded into computer system 1300. Such means can include, for example, a removable storage unit 1322 and an interface 1320. Examples can include a program cartridge and cartridge interface (such as that found in video game devices), a removable memory chip (such as an EPROM, or PROM) and associated socket, and other removable storage units 1322 and data to be transferred from the removable storage unit 1322 to computer system 1300.

Computer system 1300 can also include a communications interface 1324. Communications interface 1324 allows software and data to be transferred between computer system 1300 and external devices via communications path 1326. Examples of communications interface 1324 can include a modem, a network interface (such as Ethernet card), a communications port, etc. Software and data transferred via communications interface 1324 are in the form of signals which can be electronic, electromagnetic, optical or other signals capable of being received by communications interface 1324, via communications path 1326. Note that communications interface 1324 provides a means by which computer system 1300 can interface to a network such as the Internet.

Graphical user interface module 1330 transfers user inputs from peripheral devices 1332 to bus 1302. These peripheral devices 1332 can be a mouse, keyboard, touch screen, microphone, joystick, stylus, light pen, voice recognition unit, or any other type of peripheral unit. Among other things, these peripheral devices 1332 enable a user to operate and control texture painting as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 13. In this document, the term "computer program product" is used to generally refer to removable storage unit 1318 or a hard disk installed in hard disk drive 1312. These computer program products are means for providing software to computer system 1300.

Computer programs (also called computer control logic) are stored in main memory and/or secondary memory 1310. Computer programs can also be received via communications interface 1324. Such computer programs, when executed, enable the computer system 1300 to perform the features of the present invention as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312, or communications interface 1324. Alternatively, the computer program product may be downloaded to computer system 1300 over communications path 1326. The control logic (software), when executed by the processor 1304, causes the processor 1304 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

5. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for updating texture for a texture update region on a graphical display object comprising the steps of:

defining an overscan region representing an extension of an object surface rasterized in texture space; and updating texture in a texture map to create a dilated texture map representative of the texture update region, said texture updating step including the steps of:

updating at least one mapped texel, and updating at least one overscan texel corresponding to said overscan region.

2. The method of claim 1, further comprising the step of rendering the graphical display object to include surface detail based on texture mapping from said dilated texture map.

3. The method of claim 1, wherein said overscan region defining step includes creating an overscan array, wherein elements in said overscan array corresponding to boundary texels of said mapped region have direction codes, each direction code identifying at least one overscan texel in said texture map.

4. The method of claim 3, wherein said texture updating step includes the steps of:

for at least each mapped texel located at an object surface boundary and located in the texture update region, checking a corresponding element in said overscan array to determine whether a direction code is present;

when a direction code is present in an overscan element, interpreting said direction code to identify at least one overscan texel in said overscan region; and updating each identified overscan texel.

5. The method of claim 4, further comprising the step of:

recursively carrying out subsequent generations of overscan including:

checking elements in said overscan array corresponding to each identified overscan texel to determine whether a direction code is present;

when a direction code is present in an overscan element, interpreting said direction code to identify at least one overscan texel in said overscan region; and updating each identified overscan texel.

6. The method of claim 1, wherein wherein said overscan region defining step includes the following steps:

determining a number of overscan levels (k) and texture map dimensions (m,n);

creating an m×n coverage array and intializing coverage array elements to zero;

creating an m×n overscan array and initializing overscan array elements to zero;

rasterizing a graphical object surface to be displayed into said coverage array and setting mapped elements in said coverage array to one;

for k generations, in the coverage array, setting all zero-valued elements adjoining i-valued elements to i+1;

for each of the i+1 valued coverage array unmapped boundary elements; choosing one adjoining i-valued element, adding a code in the overscan array at a position corresponding to the chosen one adjoining i-valued element in the coverage array, where the code has a value pointing to the corresponding i+1 valued adjoining neighbor position in the overscan array; and storing a k-level overscan array.

7. The method of claim 1, wherein said overscan region defining step includes the step of creating an overscan polygon set that covers at least an overscan margin extending from a mapped polygon set corresponding to the object surface mapped in texture space.

8. The method of claim 7, wherein said texture updating step includes the steps of:

updating a mapped region of the texture map to represent texture corresponding to the texture update region including identifying polygons in the mapped region corresponding to the texture update region and updating said identified polygons to define texture corresponding to the texture update region;

for at least each updated polygon at an object surface boundary, checking for the presence of a corresponding overscan polygon in said overscan polygon set, and for each overscan polygon found in said checking step, updating a respective unmapped region of the texture map corresponding to the respective overscan polygon to represent texture corresponding to the texture update region.

9. The method of claim 7, wherein said overscan polygon set creating step includes the steps of:

determining a mapped polygon set covering rasterized object surface in texture space;

preprocessing said mapped polygon set to identify boundary edges and vertices;

computing a set of preliminary overscan polygons based on an overscan margin d; resolving intersections between polygons in said set of preliminary overscan polygons to produce said overscan polygon set; and storing said overscan polygon set.

10. The method of claim 9, wherein said computing a preliminary set of overscan polygons step includes the steps of:

for each boundary edge having a first and second vertex, constructing a quadrilateral having first, second, third and fourth sides, said first side comprising said respective boundary edge and said third side substantially parallel to said first side and offset by a predetermined distance from said first side, said second and fourth sides each connecting said first and third sides, said second side extending from a first vertex at said boundary edge, and said fourth side extending from a second vertex at said boundary edge;

wherein when said first vertex is a concave boundary vertex, said second side extends substantially perpendicular from the boundary edge, and when said first vertex is a convex boundary vertex, said second side extends at an angle substantially equal to 135 degrees–

A/4, where A is an interior angle of said convex boundary vertex; and wherein when said second vertex is a concave boundary vertex, said fourth side extends substantially perpendicular from the boundary edge, and when said second vertex is a convex boundary vertex, said fourth side extends at an angle substantially equal to 135 degrees–A/4, where A is an interior angle of said convex boundary vertex; and for each convex boundary vertex, constructing an isosceles triangle having two equal edges adjacent to edges of quadrilaterals constructed for boundary edges at said convex boundary vertex.

11. The method of claim 9, wherein said resolving intersections step comprises the steps of:

transforming z-coordinates of vertices in said set of preliminary overscan polygons that are not in said mapped polygon set from a zero value to a negative predetermined value (−w);

executing a hidden surface algorithm to identify visible parts of said set of preliminary overscan polygons; and projecting said visible parts of said set of preliminary overscan polygons back to an x, y plane to produce said overscan polygon set.

12. The method of claim 1, further comprising a texture update region specifying step that receives an input defining the texture update region, whereby, a user can specify the texture update region through a texture painting or non-painting workflow.

13. A computer graphics system for updating texture for a texture update region on a graphical display object comprising:

means for defining an overscan region representing an extension of an object surface rasterized in texture space; and means for updating texture in a texture map to create a dilated texture map representative of the texture update region, said texture updating means including:

means for updating at least one mapped texel, and means for updating at least one overscan texel corresponding to said overscan region.

14. The system of claim 13, further comprising a raster subsystem for rendering the graphical display object to include surface detail based on texture mapping from said dilated texture map.

15. The system of claim 13, wherein said overscan region defining means includes means for creating an overscan array, wherein elements in said overscan array corresponding to boundary texels of said mapped region have direction codes, each direction code identifying at least one overscan texel in said texture map.

16. The system of claim 15, wherein said texture updating means includes:

means for checking, for at least each mapped texel located at an object surface boundary and located in the texture update region, a corresponding element in said overscan array to determine whether a direction code is present;

means for interpreting said direction code to identify at least one overscan texel in said overscan region when a direction code is present in an overscan element; and means for updating each identified overscan texel.

17. The system of claim 16, further comprising:

means for recursively carrying out subsequent generations of overscan including means for checking elements in said overscan array corresponding to each identified overscan texel to determine whether a direction code is present, and when a direction code is present in an overscan element, interpreting said direction code to identify at least one overscan texel in said overscan region, and updating each identified overscan texel.

18. The system of claim 13, wherein wherein said overscan region defining means includes:

means for determining a number of overscan levels (k) and texture map dimensions (m,n);

means for creating an m×n coverage array and intializing coverage array elements to zero;

means for creating an m×n overscan array and initializing overscan array elements to zero;

means for rasterizing a graphical object surface to be displayed into said coverage array and setting mapped elements in said coverage array to one;

means for generating and storing a k generation overscan array including means for setting all zero-valued elements adjoining i-valued elements in said coverage array to i+1;

means for choosing one adjoining i-valued element for each of the (i+1) valued coverage array elements;

means for adding a direction code in said overscan array at a position corresponding to the chosen one adjoining i-valued element in the coverage array, where the code has a value pointing to the corresponding i+1 valued adjoining neighbor position in the overscan array; and means for storing a k-level overscan array.

19. The system of claim 13, wherein said overscan region defining means includes means for creating an overscan polygon set that covers at least an overscan margin extending from a mapped polygon set corresponding to the rasterized object surface.

20. The system of claim 19, wherein said texture updating means includes means for updating the mapped region of the texture map to represent texture corresponding to the texture update region, including means for identifying polygons in the mapped region corresponding to the texture update region and means for updating said identified polygons to define texture corresponding the texture update region;

means for checking, for at least each updated polygon at an object surface boundary, for the presence of a corresponding overscan polygon in said overscan polygon set; and means for updating a respective unmapped region of the texture map corresponding to each overscan polygon found by said checking means to represent texture corresponding to the texture update region.

21. The system of claim 19, wherein said overscan polygon set creating means includes:

means for determining a mapped polygon set representing the object surface mapped in texture space;

means for preprocessing said mapped polygon set to identify boundary edges and vertices;

means for computing a set of preliminary overscan polygons based on an overscan margin d;

means for resolving intersections between polygons in said set of preliminary overscan polygons to produce said overscan polygon set; and means for storing said overscan polygon set.

22. The system of claim 21, wherein said computing means includes:

means for constructing a quadrilateral for each boundary edge having a first and second vertex, said quadrilateral having first, second, third and fourth sides, said first side comprising said respective boundary edge and said third side substantially parallel to said first side and offset by a predetermined distance from said first side, said second and fourth sides each connecting said first and third sides, said second side extending from a first vertex at said boundary edge, and said fourth side extending from a second vertex at said boundary edge; wherein when said first vertex is a concave boundary vertex, said second side extends substantially perpendicular from the boundary edge, and when said first vertex is a convex boundary vertex, said second side extends at an angle substantially equal to 135 degrees−A/4, where A is an interior angle of said convex boundary vertex; and wherein when said second vertex is a concave boundary vertex, said fourth side extends substantially perpendicular from the boundary edge, and when said second vertex is a convex boundary vertex, said fourth side extends at an angle substantially equal to 135 degrees−A/4, where A is an interior angle of said convex boundary vertex; and means for constructing an isosceles triangle for each convex boundary vertex, each isosceles triangle having two equal edges adjacent to edges of quadrilaterals constructed for boundary edges at said convex boundary vertex for each convex boundary vertex.

23. The system of claim 21, said resolving intersections means includes:

means for transforming z-coordinates of vertices in said set of preliminary overscan polygons that are not in said mapped polygon set from a zero value to a negative predetermined value (−w);

means for executing a hidden surface algorithm to identify visible parts of said set of preliminary overscan polygons; and means for projecting said visible parts of said set of preliminary overscan polygons back to an x, y plane to produce said overscan polygon set.

24. The system of claim 13, further comprising means for specifying a texture update region that receives an input defining the texture update region, whereby, a user can specify the texture update region through a texture painting or non-painting workflow.

25. A computer program product comprising a computer useable medium having computer program logic recorded thereon for enabling a processor in a computer graphics system to permit a user to update texture for a texture update region, said computer program logic comprising:

means for enabling the processor to define an overscan region representing an extension of an object surface rasterized in texture space; and means for enabling the processor to update texture in a texture map to create a dilated texture map representative of the texture update region including:

means for enabling the processor to update at least one mapped texel, and means for enabling the processor to update at least one overscan texel corresponding to said overscan region.

26. A method for updating texture, comprising the steps of:

in a preprocessor stage, defining an overscan region representing an extension of an object surface mapped to texture space; and in a texture update stage, creating a dilated texture map that includes updated mapped texels for a mapped region and updated overscan texels corresponding to said overscan region, such that texture is updated in said mapped region and said overscan region to represent a texture update region.

27. A system for updating texture, comprising:

a preprocessor stage that defines an overscan region representing an extension of an object surface mapped into texture space; and a texture update stage that creates a dilated texture map that includes updated mapped texels for a mapped region and updated overscan texels corresponding to said overscan region, such that texture is updated in said mapped region and said overscan region to represent a texture update region.

* * * * *